United States Patent
Kubo et al.

(10) Patent No.: US 6,297,616 B1
(45) Date of Patent: Oct. 2, 2001

(54) CHARGE AND DISCHARGE SYSTEM FOR ELECTRIC POWER STORAGE EQUIPMENT

(75) Inventors: Kenji Kubo, Hitachi; Takahiro Nomura, Niigata; Norikazu Tokunaga, Hitachi; Hideki Miyazaki, Hitachi; Akihiko Emori, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/484,524

(22) Filed: Jan. 18, 2000

(30) Foreign Application Priority Data

Jan. 18, 1999 (JP) .................................. 11-008824
Oct. 13, 1999 (JP) .................................. 11-290990

(51) Int. Cl.$^7$ .................................................. H01M 10/46
(52) U.S. Cl. .................................................. 320/116
(58) Field of Search .................................... 320/116, 119, 320/121, 122, 138

(56) References Cited

U.S. PATENT DOCUMENTS

| | | | | |
|---|---|---|---|---|
| 5,412,305 | * | 5/1995 | Jeanneret | 320/119 |
| 5,523,668 | * | 6/1996 | Feldstein | 320/119 X |
| 5,659,237 | * | 8/1997 | Divan et al. | 320/119 |
| 5,726,551 | * | 3/1998 | Miyazaki et al. | 320/119 X |
| 5,767,660 | * | 6/1998 | Schmidt | 320/119 X |

* cited by examiner

*Primary Examiner*—Edward H. Tso
(74) *Attorney, Agent, or Firm*—Antonelli, Terry, Stout & Kraus, LLP

(57) ABSTRACT

A charge and discharge apparatus for electric power storage means has an AC power source, a transforming apparatus, which comprises a primary winding connected to the AC power source, and plural secondary windings, and plural electric power converters comprising plural AC sides, respective ones of which are connected to a respective one of the plural secondary windings, and plural DC sides, respective ones of which are connected to a respective one of the plural electric power storage means.

13 Claims, 27 Drawing Sheets

CHARGE AND DISCHARGE SYSTEM FOR ELECTRIC POWER STORAGE EQUIPMENT

BACKGROUND OF THE INVENTION

The present invention relates to a charge and discharge system for electric power storage equipment, and a method of manufacturing the electric power storage equipment using the same.

In the manufacture of a lithium-ion secondary battery or nickel-metal hydride secondary battery, and the like, a charging treatment or a charging-discharging treatment of a unit battery is performed in order to inspect the secondary battery after assembling, or to activate chemical reactions, and so on. Conventionally, when a defective battery was found in the charging-discharging test of the batteries after assembling, it was necessary to select the defective battery individually. Therefore, the charging-discharging operation is performed on each battery individually by providing an independent charge and discharge power source for each battery.

In particular, a lithium ion secondary battery requires not only constant current charging, but also constant voltage charging during a charging operation. Therefore, an individual electric power source system for charging, which makes it possible to set the charging current and the charging voltage individually for respective batteries, is used.

On the other hand, when the battery is to be used for electric vehicles or batteries for electric power storage, a set of batteries is formed by connecting a plurality of unit batteries in series. The set of unit batteries connected in series is charged by applying a voltage at both end terminals, and voltage is discharged from both end terminals for taking out electric power. In a case when the set of batteries is charged or discharged under a condition wherein the batteries are connected in series, the same charging current flows through all the respective batteries. Therefore, if the capacity of one of the respective batteries differs somewhat from the other batteries, a variation in the voltage of the individual battery is generated.

Particularly, a lithium-ion secondary battery requires that the battery voltage be maintained at a value lower than a designated voltage during the charging operation. Therefore, a charge and discharge system, wherein a set of batteries connected in multi-series is charged or discharge, is well-known, as disclosed in JP-A-8-88944 (1996). In order to suppress the variation in the individual batteries connected in series, an electric power source is provided to the respective batteries for correction.

However, in the case when an individual unit battery is charged or discharged by a respective charge and discharge electric power source, a number of charge and discharge electric power supplies, which is proportional in number to the number of the unit batteries being charged or discharged simultaneously, are required. Particularly, the charge and discharge apparatus for activation treatment or inspection of the secondary batteries after assembling requires several hours for a series of charging-discharging operations. Therefore, in order to improve production efficiency, it is necessary to charge or discharge a large number of unit batteries simultaneously using a large number of charge and discharge electric power supplies. Therefore, a problem is generated in that a large number of the electric power supplies are required, in spite of the need only for charging or discharging a large number of unit batteries with a similar current and voltage pattern.

In accordance with the charge and discharge system, wherein plural unit batteries are connected in series for composing a set of batteries, and wherein the charging or discharging of the set of plural batteries is carried out simultaneously using an electric power source for the simultaneous charging or discharging, circuits for bypassing defective batteries which are detected during the charging or discharging operations are required for every one of the batteries. In order to charge or discharge the batteries so that the voltage of respective batteries becomes uniform by compensating a variation in voltage caused by variation in the capacity of a particular battery, a respective charge and discharge electric power source is required for each respective battery. In particular, for a lithium-ion secondary battery, it is necessary to perform charging or discharging while measuring the voltage of the respective battery precisely. In a condition under which each of the unit batteries is connected in series, the voltage of the respective battery must be detected by a differential voltage, and a problem arises in that the circuit for detecting the voltage becomes complex.

In a case when a plurality of batteries connected in parallel are charged or discharged, the charging current or discharging current does not become uniform, and so each of the batteries can not be charged fully. Furthermore, additional circuits for detecting a failed battery and separating the failed battery become necessary.

SUMMARY OF THE INVENTION

The present invention has been achieved in consideration of the above problems.

The charge and discharge apparatus for electric power storage means relating to the present invention comprises an AC power source; a transformer comprising a primary winding connected to the AC power source, and plural secondary windings; and plural electric power converters comprising plural AC sides connected to plural secondary windings, and plural DC sides for connection to plural electric power storage means.

In accordance with the present invention, the plural electric power storage means can be charged simultaneously from the AC power source, or plural electric power storage means can be discharged simultaneously to the AC power source, because the electric power storage means is connected to plural secondary windings of the trans former, which is connected to the AC power source.

The charge and discharge apparatus of the electric power storage means according to the present invention comprises an apparatus having a charging function, an apparatus having a discharging function, and an apparatus having a charging and discharging function. As the AC power source, various apparatus which can output AC power are usable. However, an apparatus which comprises an electric power converter connected to a transformer is desirable. In this case, charging or discharging plural electric power storage means can be controlled simultaneously as an unit by controlling the electric power converter so that the current flowing through the primary winding becomes a current reference. As the electric power storage means, there are secondary batteries, a battery set wherein plural unit secondary batteries are connected in series, electrical double layer capacitors, condensers, fuel cells, and so on.

In accordance with the charge and discharge apparatus of the electric power storage means according to the present invention, a motor driving system can be composed by providing an AC power source to the electric power converter, and furthermore, providing a motor, and an inverter for driving the motor, to which the electric power is supplied from the electric power converter. In accordance with the charge and discharge apparatus of the electric power storage means according to the present invention, an electric power storage means can be composed by connecting the AC power source to an electric power system.

A method of manufacturing the electric power storage means according to the present invention comprises the steps of: assembling main bodies of plural electric power storage means; connecting one of the assembled plural electric power storage means to respective of the DC side of the plural electric power converter in the charge and discharge apparatus of the electric power storage means according to the present invention; and performing initial charging, or initial discharging, or aging treatment with the plural electric power storage means by the charge and discharge apparatus of the electric power storage means according to the present invention.

In accordance with the present invention, it becomes possible to perform initial charging, or initial discharging, or aging treatment with the plural electric power storage means simultaneously as a unit by the AC power source in the manufacturing steps of the electric power storage means. Desirably, the AC power source comprises an electric power converter connecting to the primary winding of the transformer. In this case, the initial charging, or the initial discharging, or the aging treatment of the plural electric power storage means can be controlled simultaneously as an unit by controlling the electric power converter so as to make the current flowing through the primary winding into a current reference.

DESCRIPTION OF THE PREFERRED EMBODIMENTS

Figure 1:
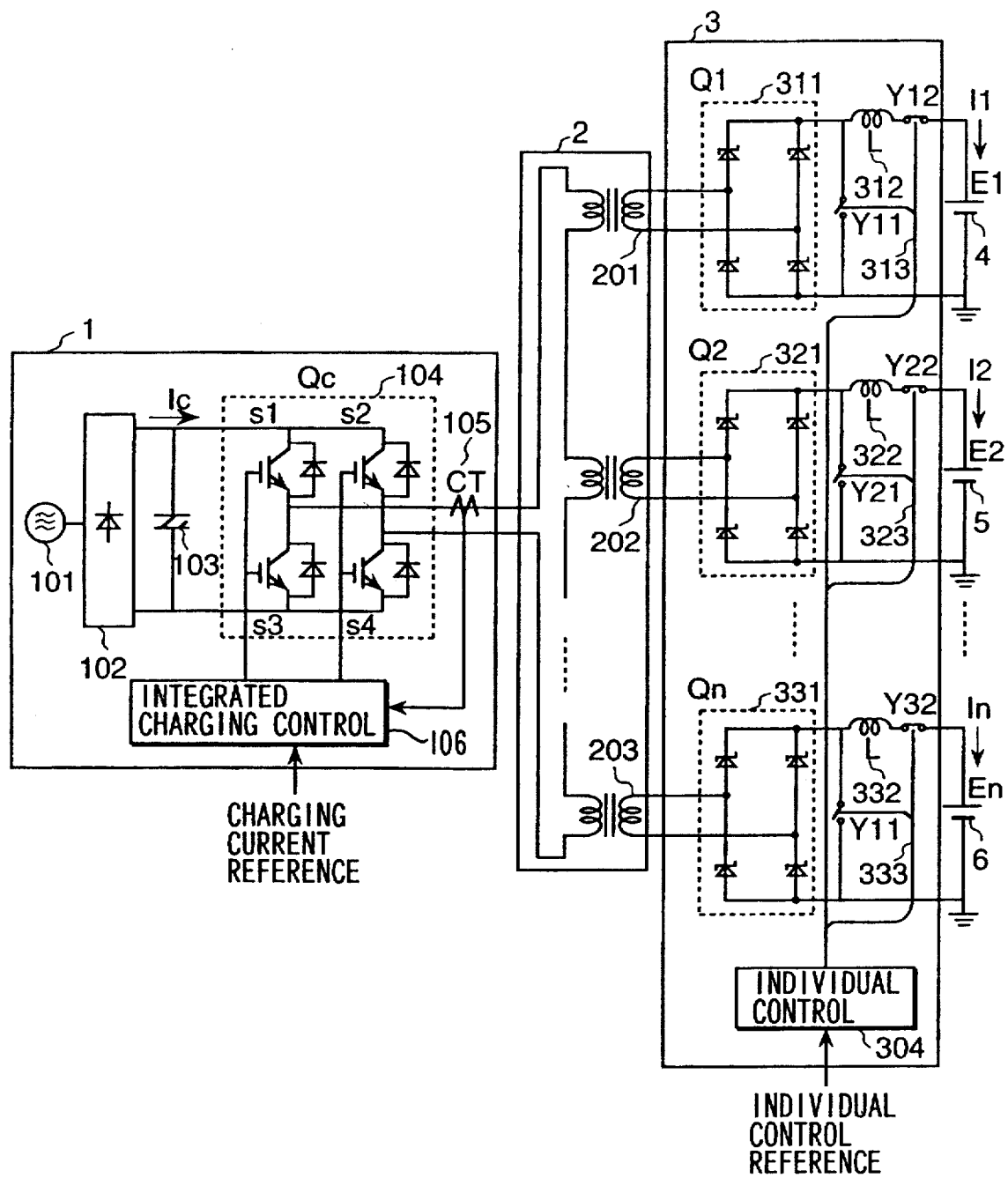
FIG. 1 is a wiring diagram indicating the composition of the charge power source representing a first embodiment.

Hereinafter, a case in which n (n>2) secondary batteries are charged simultaneously as a unit will be explained with reference to FIG. 1, which illustrates a first embodiment of the present invention. In accordance with FIG. 1, the output of the AC power source 1 is connected to the primary side of a transformer 2, and the transformer 2 has n secondary windings 201, 202, and 203 for outputs. Here, plural primary windings of the transformer 2 are connected in series, and the output of the AC power source 1 is applied across the ends of the series connected primary windings. Respective ones of the secondary side outputs of the transformer 2 are supplied to respective unit cells via the AC/DC converting means 3, comprising n AC/DC converter units. The AC power source 1 can be implemented by rectifying an AC voltage received from the three phase commercial electric power source 101 by way of the rectifying diode converter 102, and converting the DC voltage obtained by smoothing the above output using the ballast capacitor 103 to an AC voltage having a desired frequency by means of full bridge converter 104. Here, when the three phase commercial voltage is AC 200 V, the DC voltage becomes approximately 280 V. The full bridge converter is composed of IGBT (Insulated Gate Bipolar Transistor) elements, i.e. a semiconductor switching element, and the frequency of the AC output voltage becomes 20 kHz.

The secondary circuit of the transformer is composed of the rectifying diode bridges 311, 321, 331, which are respectively associated with respective secondary batteries, and reactors 312, 322, 332, which are respectively connected to the DC output of the respective diode bridges. The secondary circuit of the transformer converts the AC voltage at the secondary side of the transformer to a DC voltage, and supplies a charging current to the respective secondary batteries 4, 5, and 6.

Here, when the ratio of the winding number of the windings respectively connected to the primary side and the secondary side of the transformer is set to 1:a, the ratio of the current at the primary side windings connected in series versus the output current of the respective secondary side windings of the transformer becomes a:1. The primary side current and plural secondary side currents of the transformer flow according to the above relation, regardless of fluctuations of battery voltage, internal resistance, and other characteristic of the respective batteries. Accordingly, the current at the secondary side of the transformer can be controlled simultaneously as a unit by controlling the full bridge converter 104 so that the current at the primary side of the transformer coincides with a predetermined current reference. The switches Y11, Y21, Y31, for shunting the outputs of the rectifying diode bridges 311, 321, 331, and the switches Y12, Y22, Y32, for separating the connection with the respective batteries 4, 5, 6, are provided in respective secondary circuits. Each of these switches is controlled for on/off operation according to the respective controlling signals 313, 323, 333 from the controlling apparatus 304.

Figure 2:
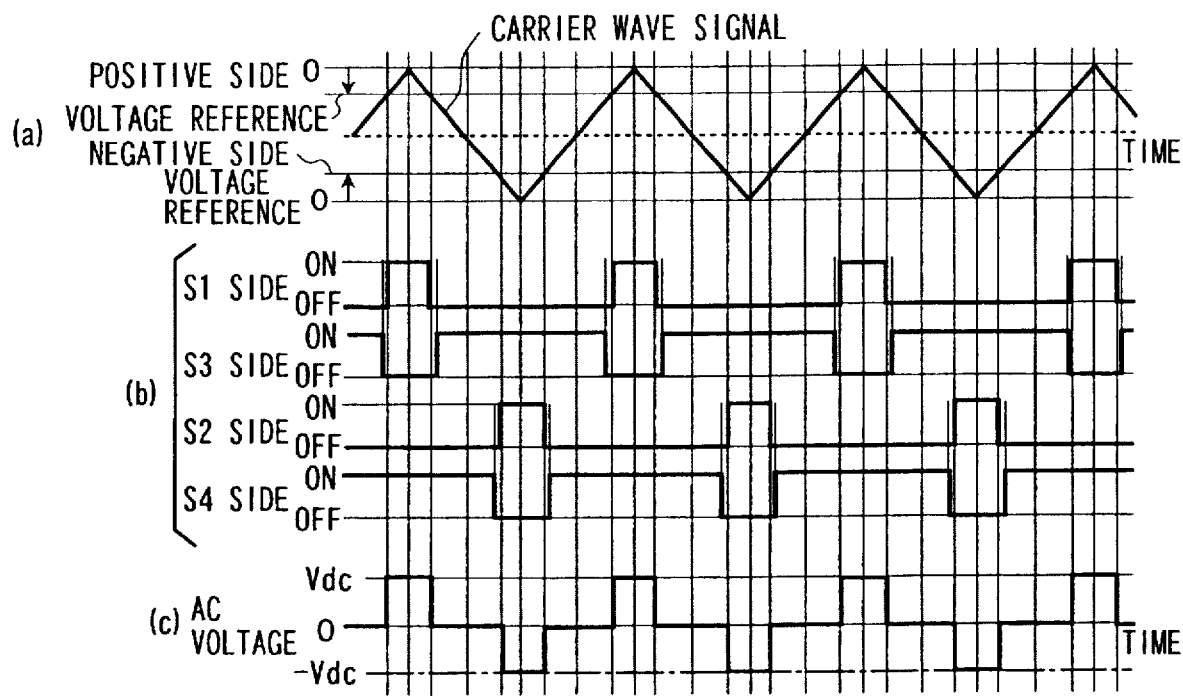
FIG. 2 is a waveform diagram indicating an operation waveform of the charge power source of the first embodiment.
Figure 3:
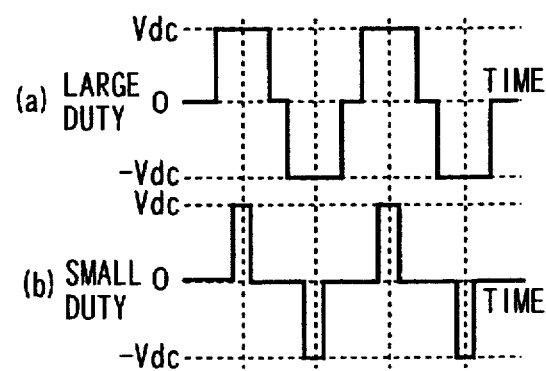
FIG. 3 is a waveform diagram indicating an operation waveform of the charge power source of the first embodiment.

The operation waveforms relating to this embodiment are indicated in FIG. 2. The full bridge converter 104 outputs an AC voltage which alternates with a high frequency of 20 kHz. As indicated in FIG. 2(a), gate driving signals, s1, s2, s3, s4 of the IGBT elements can be obtained by comparing a triangular wave shaped carrier wave signal having the same frequency as the output frequency of the full bridge converter 104 with the signals indicating the positive voltage command and the negative voltage command. Here, in order to produce on/off control supplementarily, a non-lapping period of approximately several microseconds is provided between signals s1 and s3, and between signals s2 and s4. The AC voltage indicated in FIG. 2(c) can be obtained by driving the IGBT elements of the full bridge converter 104 with these signals. The AC output becomes a rectangular wave voltage having a peak value of Vdc, a cycle of 50 μs, and a conduction ratio proportional to the values of the positive side and the negative side voltage commands. Examples of the AC voltage waveforms in the cases when the conduction ratios differ each other are indicated in FIGS. 3(a) and 3(b).

A voltage obtained by dividing the primary voltage with the number of series n is output to respective secondary side outputs by applying the AC voltage to the primary side of the transformer 2. The voltage share at the secondary output is determined depending on the individual battery voltage and so on. The secondary side voltage is rectified by the rectifying diode bridges 311, 321, 331 for converting it to a DC voltage, and a charging current flows, depending on the difference between the above voltage and the battery voltage, via the reactors 312, 322, 332.

As seen from the full bridge converter 104, the individual batteries coupled to the secondary circuits of the transformer 2 are connected in series. Accordingly, the current to the primary side and the charging current to the batteries connected to respective secondary circuits are in a relationship of the winding number ratio, and the charging current to each respective battery is equal, even if the battery voltage or internal resistance of an individual battery varies. Therefore, the charging current to every respective battery can be controlled by controlling the current of the full bridge converter 104.

Figure 4:
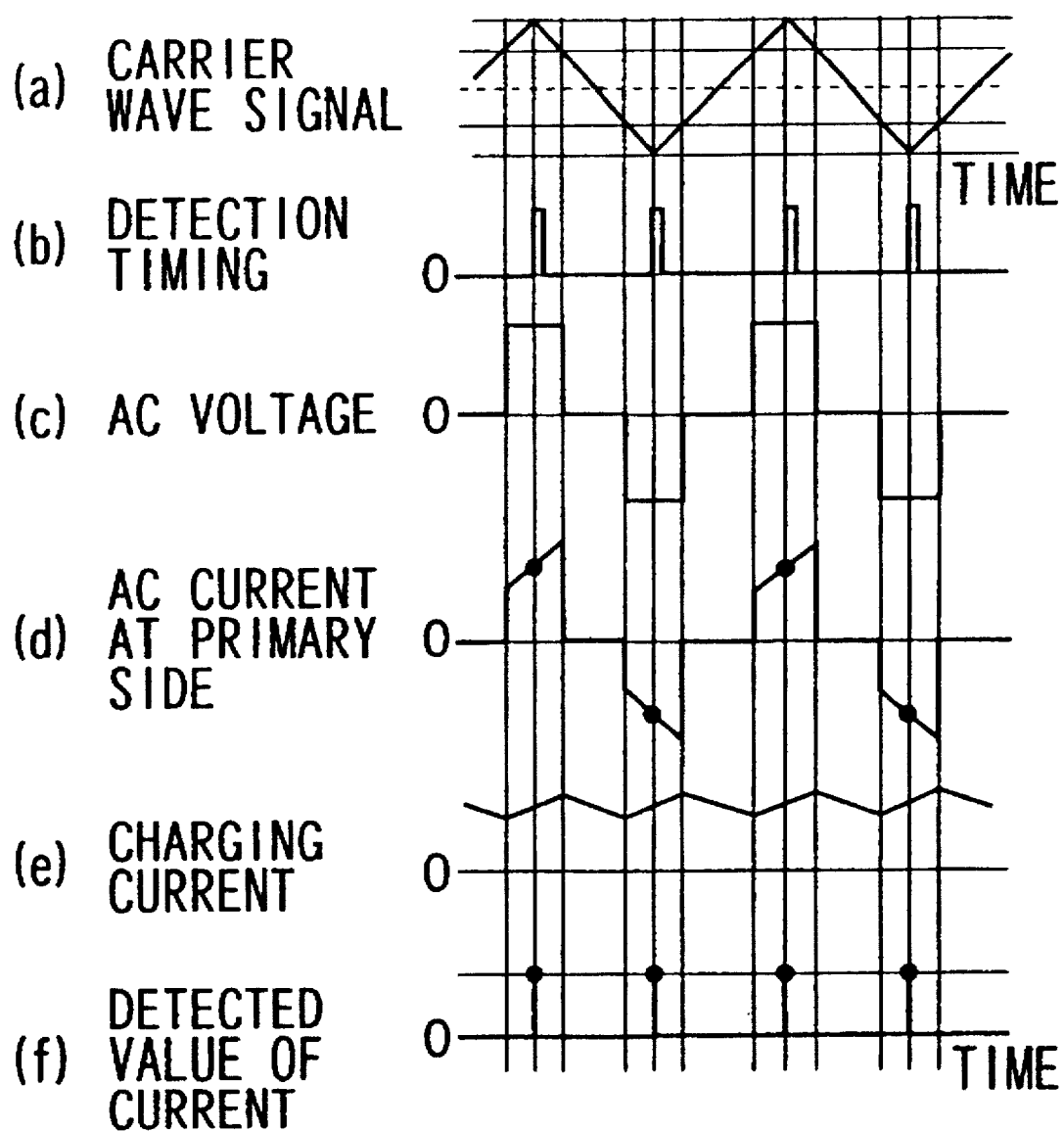
FIG. 4 is a waveform diagram indicating an operation waveform of the charge power source of the first embodiment.

The waveforms of the AC current at the primary side of the transformer and of the charging current to each respective battery are indicated in FIG. 4 at lines (d) and (e). In accordance with the figure, it is seen that the charging current coincides with the AC current at the primary side of the transformer during the period when the gate signals s4 and s1 to the full bridge converter 104 are "on", or gate signals s2 and s3 are "on". Therefore, the charging current to each individual battery can be detected from the AC current at the primary side of the transformer by detecting the AC current with the current detector 105 (CT Current Transformer) in the present embodiment) synchronized with the minimum amplitude time point (valley of the triangular waveform carrier signal) of the carrier signal for generating a gate signal, and by maintaining the detected value until next detecting time point, as indicated in FIG. 4(f).

Using the detected current value at the primary side of the transformer, the charging current to the secondary batteries connected to the secondary side of the transformer can be controlled to be equal to each other, even if there is a variation in voltage, internal resistance, and other characteristic of the individual batteries, by controlling the duty of the full bridge converter so that the detected current value at the primary side of the transformer becomes equal to the charging current reference. Here, the voltage of each individual battery can be detected based on a common potential, because the secondary side of the transformer is insulated, and each one of the terminals of the individual battery can be grounded.

Figure 5:
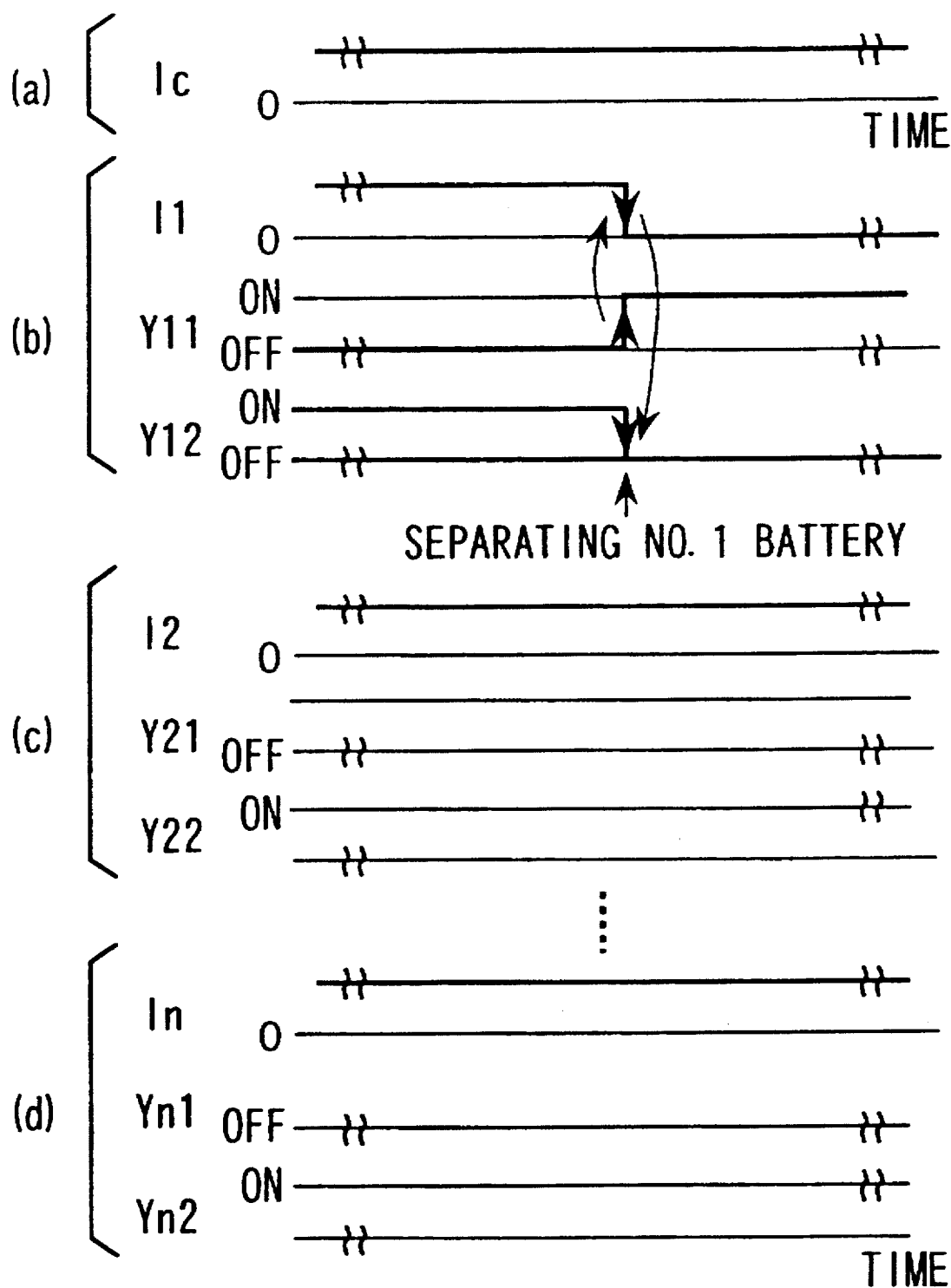
FIG. 5 is a timing diagram relating to the charge power source of the first embodiment.

In accordance with the present embodiment, when a failed battery is detected during charging, it is necessary to separate the failed battery from the secondary circuit and to continue charging the other batteries, because the charging is performed under a condition in which the batteries are connected in series via the transformer. When the battery voltage varies during the charging period, it is necessary to bypass the charging current to the individual battery and to adjust the charging current to the individual battery. The operation waveform in this case is indicated in FIG. 5.

The output current from the full bridge converter 104 is expressed by Ic, and the charging current to each individual battery is expressed by I1, I2 . . . . In, respectively. When each of the switches of the secondary circuit Y11, Y21, Y31 are "off", and the switches Y12, Y22, Y32 are "on", the batteries are charged normally. On the contrary, the corresponding secondary circuit can be shunted by turning the first switch of the secondary circuit Y11 "on", whereby the charging current flows to the switch Y11 side and the battery 4 can be bypassed.

The battery 4 can be separated from the charging circuit by turning the switch Y22 "off" after the bypass operation. Here, if a semiconductor switching element, such as a power MOSFET (Metal Oxide Semiconductor Field Effect Transistor), is used as the switch Y11, the bypassing of the voltage of an individual battery can be controlled precisely, and accordingly, the current of the respective secondary circuit can be compensated. The load is varied as seen from the full bridge converter 104 by operating a respective one of the switches Y11, Y21, Y31 to be on/off, respectively, but the output current from the full bridge converter 104 can be controlled to a desired value.

As described above in detail, in accordance with the present embodiment, plural batteries connected in series at the secondary side of the transformer can be charged simultaneously as an unit by the transformer, wherein the primary side is connected in a multi-series manner. Accordingly, an advantage of a simple circuit composition in comparison with the case when plural batteries are charged by individual power sources is realized.

Furthermore, an advantage is realized in that the plural batteries can be charged simultaneously as a unit effectively without increasing the current, because the batteries are charged under a condition in which the battery voltages are connected in series.

The voltage of each respective battery can be measured based on a common potential, because the batteries connected to the secondary side of the transformer are each insulated, and an advantage is realized in that the voltage of the plural batteries can be measured readily.

Also, an advantage is realized in that the charging current can be controlled as an unit without regard to the number of secondary circuits by detecting the current of the primary side of the transformer in synchronism with the switching operation of the full bridge converter, and by controlling the output current of the full bridge converter so as to coincide with the desired charging current reference.

Further, an advantage is realized in that a current free from the influence of a current ripple of the charging current can be detected, because the value at approximately the middle point of the current ripple according to the duty control of the full bridge converter can be detected as the detected value of the current.

In accordance with the present embodiment, an arbitrary battery, which is detected as a failed battery, can be separated from the charging circuit even during the charging operation. Therefore, the failed battery can be separated while continuing the charging operation for the other batteries.

There is an advantage in that a variation in battery voltage can be complemented by compensating the charging current to the individual batteries using the function to bypass the charging current.

Figure 6:
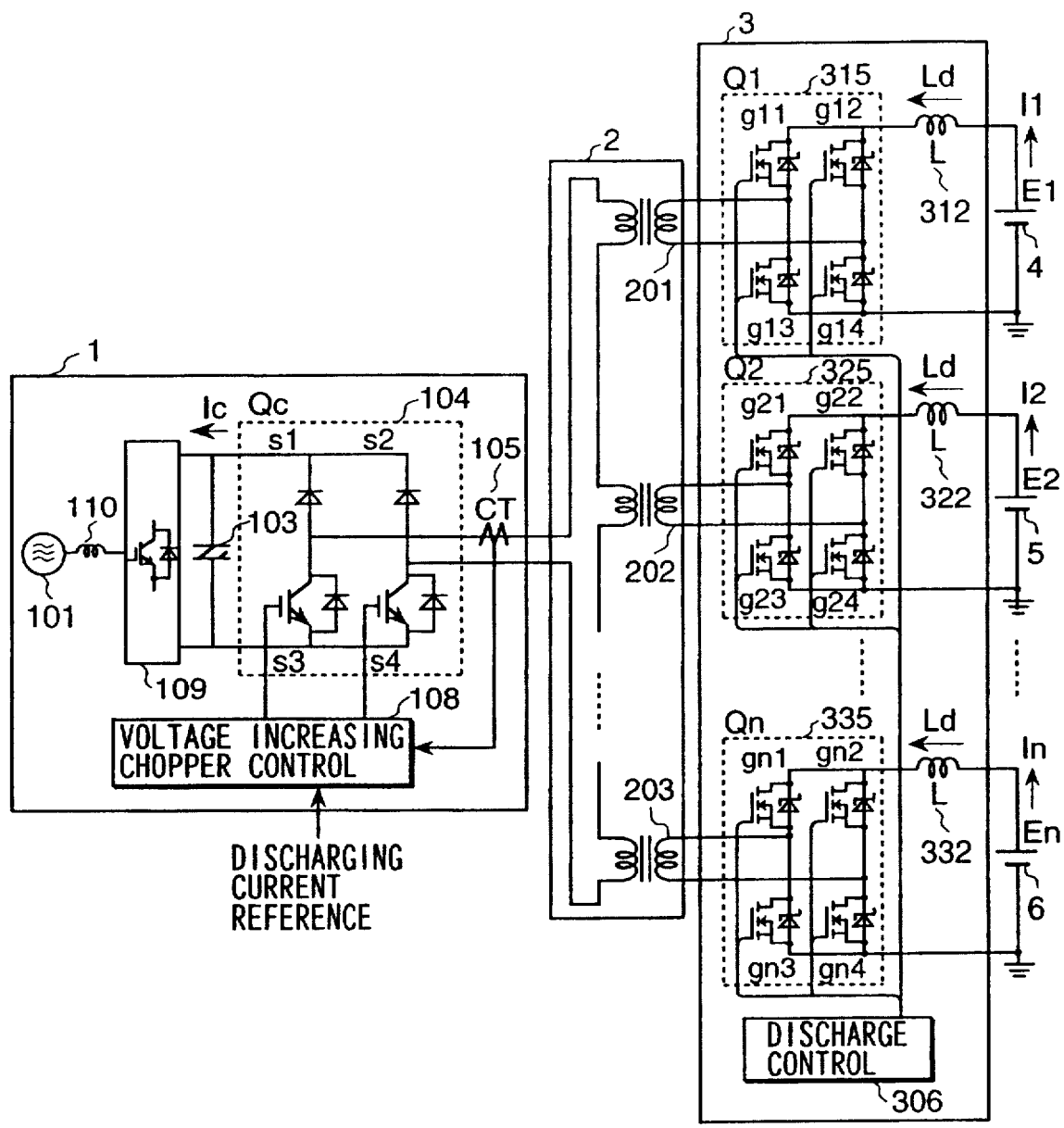
FIG. 6 is a wiring diagram indicating the composition of the discharge power source of a second embodiment.

Next, a second embodiment of the present invention will be explained with reference to FIG. 6. The reactors 312, 322, 332 are connected to the outputs of the individual batteries 4, 5, 6, respectively; the output of each reactor is converted to an AC voltage by a respective full bridge converter 315, 325, 335; and the AC voltage is supplied to plural secondary side windings of the transformer, respectively. Here, the full bridge converter is composed of power MOSFET elements. In the transformer 2, the primary windings are connected in a multi-series manner and coupled to corresponding secondary windings, the electric power charged to each respective battery is regenerated to the power source 101 via ballast capacitor 103, regenerating converter 109, and reactor 110 by making the output voltage at the primary side operate to increase the voltage chopping operation performed by the converter 107 and its controlling circuit 108.

Figure 7:
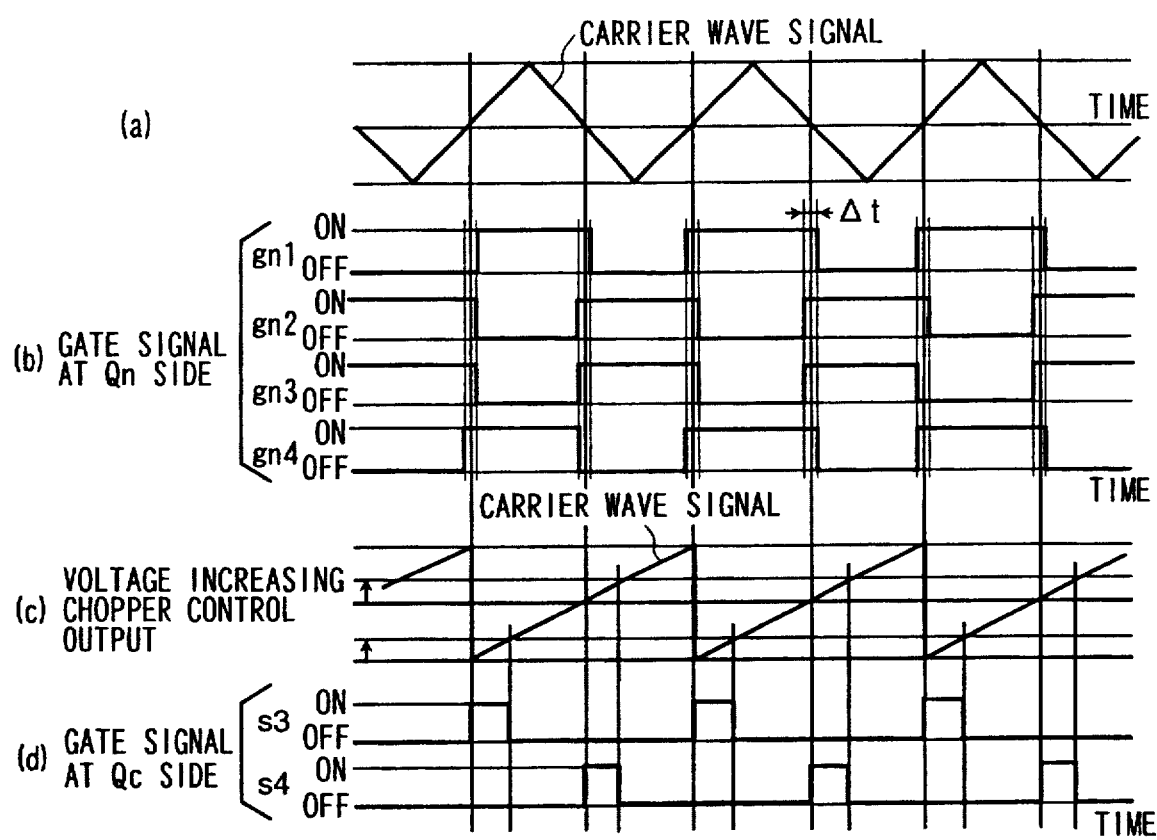
FIG. 7 is a waveform diagram indicating an operation waveform of the discharge power source of the second embodiment.

The gate signals of the full bridge converters 315, 325, 335 of the respective batteries and the gate signal of the converter 107 side at this time are shown in FIG. 7. As indicated in FIGS. 7(c) and (d), the converter 107 operates to turn the gate signals s3, s4 of the IGBT elements in the negative side arms on/off with designated chopper cycles. During the "on" period of the gate signals s3 and s4, the batteries at the secondary side of the transformer are short circuited via the reactors 312, 322, 332. On the other hand, during the "off" period of the gate signals s3, s4, the electric power stored in the reactor of the respective battery is released to the ballast capacitor side 103. Here, the DC voltage of each respective battery is converted to an AC voltage having a fixed frequency and a fixed voltage (here, the level of the AC voltage is proportional to the battery voltage) by the full bridge converters 315, 325, 335, of the respective battery. Therefore, the same gate signal is supplied to all of the full bridge converters of the batteries in synchronism with the carrier signal for generating a gate signal of the converter 107, as indicated in FIGS. 7(a), (b).

Furthermore, a short circuit period signal for short circuiting the upper and lower arms is given, at an on/off switching time of the power MOSFET elements of the full bridge converters 315, 325, 335. Accordingly, the current of the reactor of the respective battery can be controlled continuously even at the time of switching the positive and negative polarity of the AC voltage. Furthermore, the short circuit period for the polarity switching time of the full bridge converter can be provided during the "on" period of the chopper for increasing the voltage by setting the short circuit signal so as to be synchronized with the "on" period of the chopper controlling signal of the converter 107.

Accordingly, the battery voltage can be converted to AC for every battery, respectively, and the discharge can be performed simultaneously as a unit under the condition that the respective batteries are connected in a multi-series manner with the transformer 2 while giving no effect to the chopper operation for the increasing voltage. Even during the discharging period, the current value corresponding to the discharging current from respective batteries can be discharged by detecting the AC current at the primary side of the transformer in synchronism with the "on" period of the chopper for increasing the voltage. The above operations are relatively the same as the operation for detecting the charging current at the primary side of the transformer in the simultaneous charging as an unit.

In accordance with the second embodiment of the present invention as described above in detail, control of the chopper for increasing the voltage can be performed under a condition that the battery voltage is converted to AC and the battery voltages are connected in series by the transformer. Therefore, the discharge can be performed simultaneously as a unit without providing any power source for discharging to the respective batteries, and the discharge can be performed readily with simple control. Furthermore, an advantage can be realized in that the discharge as a unit can be performed without being influenced by the short circuit period accompanied with the AC conversion of the respective battery voltage by synchronizing the gate signal for controlling the chopper for increasing the voltage with the gate signal of the full bridge converter for converting respective battery voltages to an AC voltage.

Figure 8:
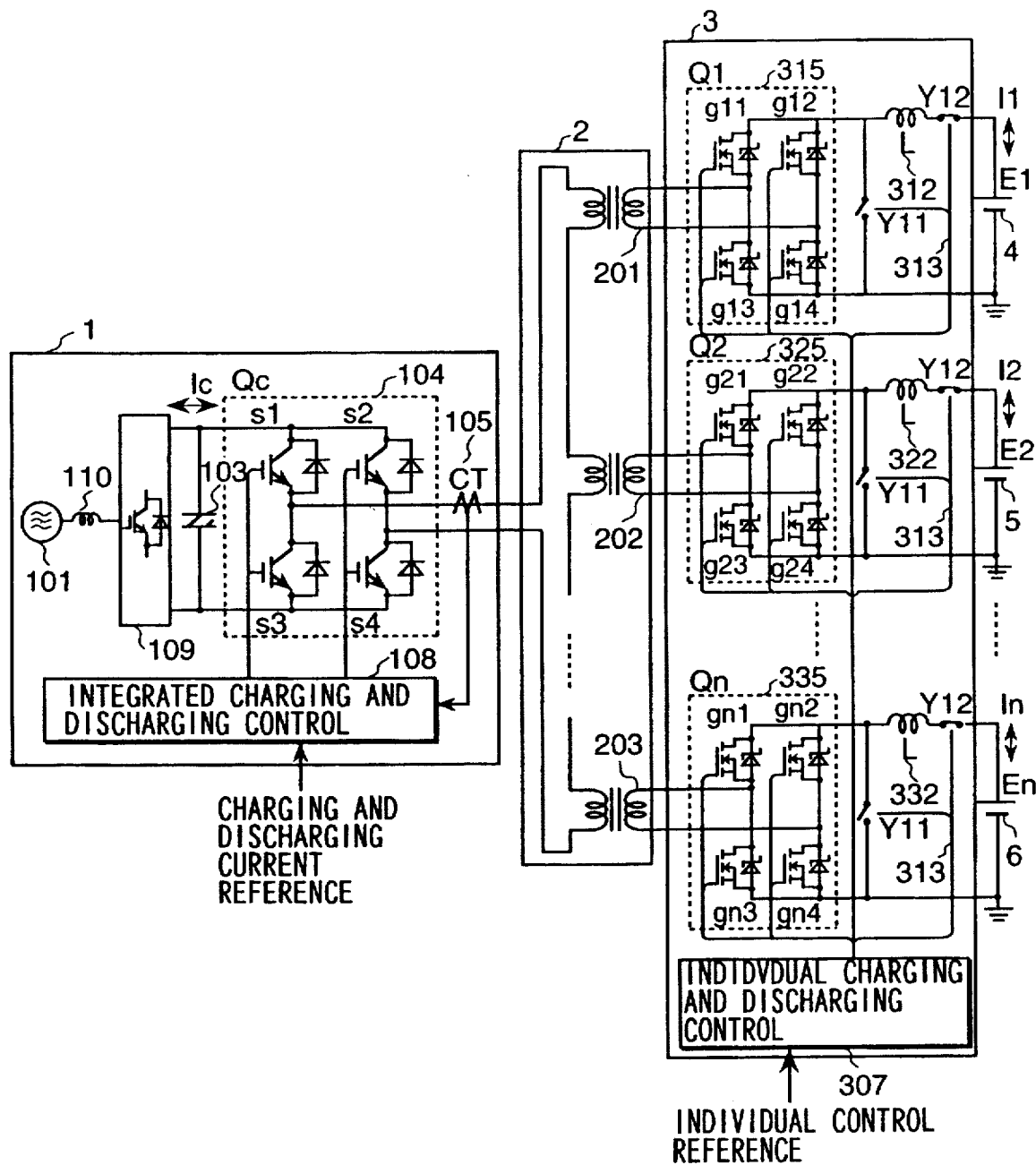
FIG. 8 is a wiring diagram indicating the composition of the charge and discharge power source of a third embodiment.

A third embodiment of the present invention will be explained hereinafter with reference to FIG. 8.

The third embodiment differs from the first and second embodiments with regard to the full bridge converter 104 for charging and discharging as a unit, and the full bridge converters 315, 325, 335 for each of the batteries. By providing both converters as full bridge converters and controlling the gate signals to them, charging as a unit, discharging as a unit, separating a failed battery, controlling the charge as a unit, controlling each respective charge, controlling the discharge as a unit, and controlling each respective discharge can be performed.

As explained above, in accordance with the third embodiment, an advantage is realized in that controlling the charge and discharge operations in various operation modes can be switched and performed by controlling each of the gate signals with the same circuit composition.

Figure 9:
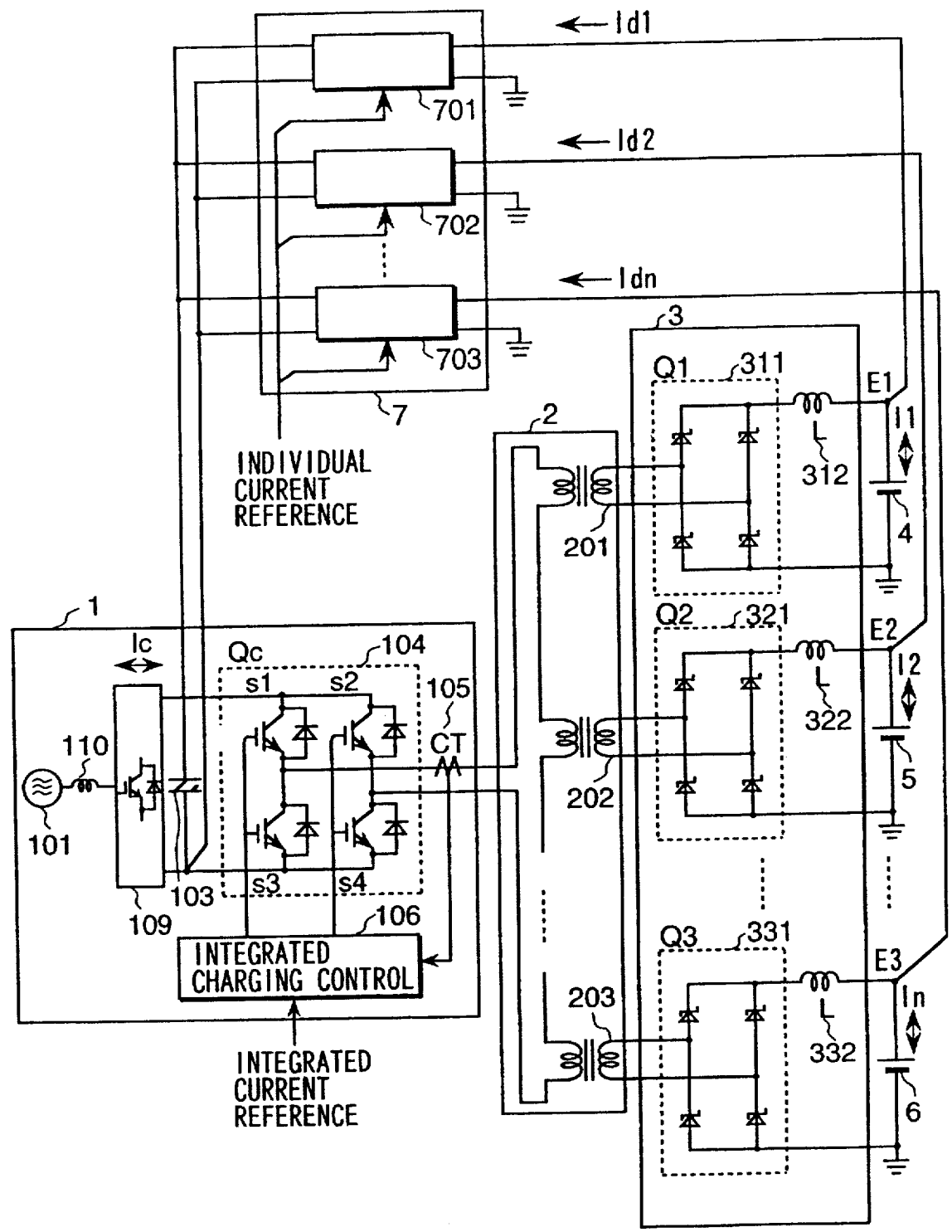
FIG. 9 is a wiring diagram indicating the composition of the charge and discharge power source of a fourth embodiment.

A fourth embodiment of the present invention will be explained hereinafter with reference to FIG. 9. The present embodiment is composed by adding an individual discharge power source 7 to the batteries in the first embodiment indicated in FIG. 1. The individual discharge power source 7 is connected between each respective output of the individual DC/AC converter 3 (that is, between terminals of a respective battery) and the ballast capacitor 103. The individual discharge power source is composed of a current controlled insulating type switching power source.

Figure 10:
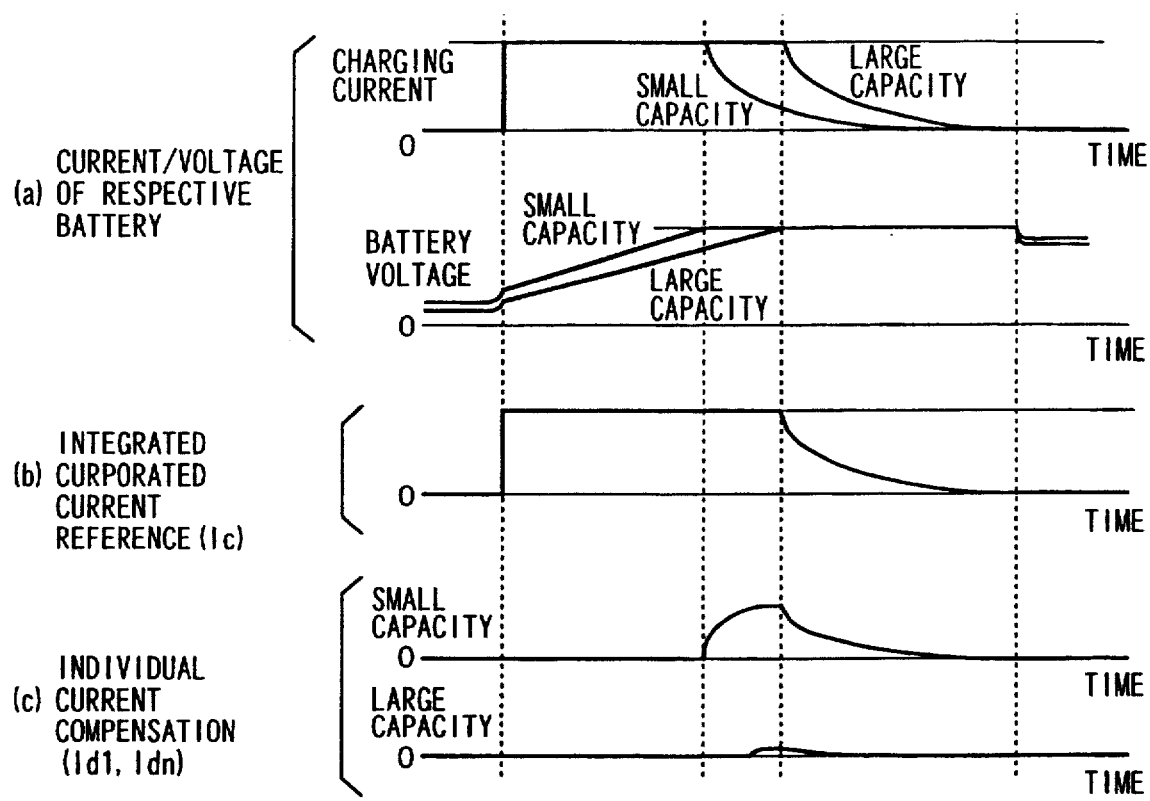
FIG. 10 is a waveform diagram indicating an operation waveform of the charge and discharge power source of the fourth embodiment.

In accordance with the present composition, the charging current Ic2 as a unit is supplied from the full bridge converter 104 to the respective batteries during the charging operation. On the other hand, an individual current reference is given to respective individual discharge power sources, and the currents Id1, Id2, Idn are regenerated to the ballast capacitor 103 from respective batteries in accordance with the current reference. Accordingly, the charging current to each respective battery becomes a value obtained by subtracting the current Id1, Id2, Idn of an individual discharge power source from the charging current Ic2 as a unit. Therefore, the charging current to a respective battery can be corrected corresponding to variation in the respective battery capacity by operating the individual discharge power source during charging as a unit. On the other hand, during the discharging period of the respective battery, the discharging current Id1, Id2, Idn from respective batteries can be regenerated to the power source 101 side by the individual discharge power source. Accordingly, charging as a unit, controlling an individual charge, and individual discharging can be performed. The waveforms in these cases are indicated in FIG. 10.

In accordance with the fourth embodiment as explained above in detail, compensation including individual charging control during charging as a unit can be performed by the individual discharge power source for discharging. Therefore, charging and discharging control can be performed with a simple circuit composition. Thus, an advantage is realized in that discharge of a respective battery can be controlled with a wide range of battery voltage including a condition in which the battery voltage is small, because an individual power source having a large voltage increasing ratio is used for the discharging operation.

Figure 11:
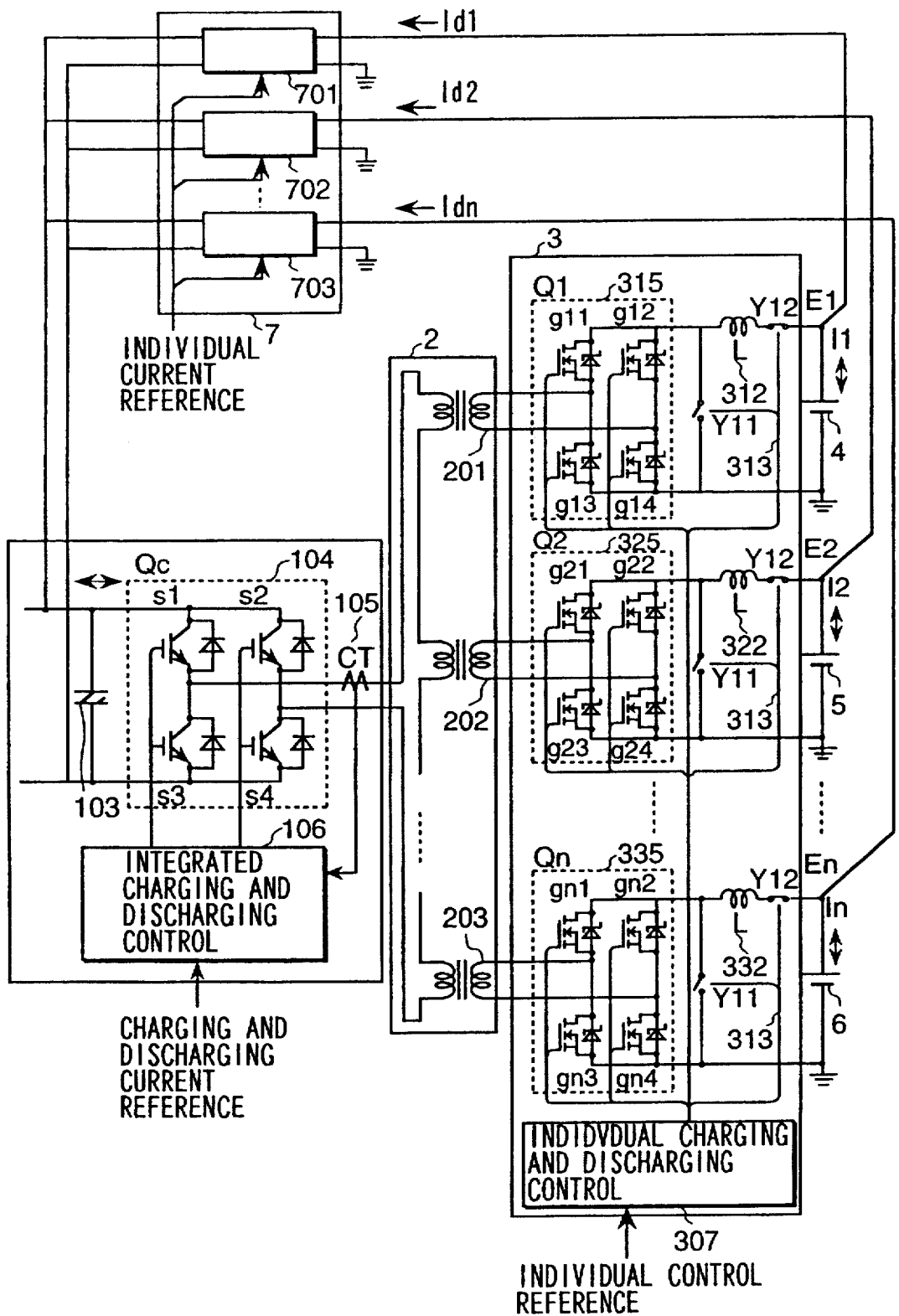
FIG. 11 is a wiring diagram indicating the composition of the charge and discharge power source of a fifth embodiment.

A fifth embodiment of the present invention is illustrated in FIG. 11. The fifth embodiment differs from the fourth embodiment indicated in FIG. 9 in that a power source for individual discharge is added, which makes it possible to discharge each battery individually, in addition to the charge and discharge apparatus which is capable of charging and discharging as a unit. In accordance with the present embodiment, the individual discharge power source is added to the full bridge converter which is capable of charging and discharging as a unit. Therefore, the capacity of the individual discharge power source can be minimized to a point of being just sufficient for correcting the variation in the capacity of a respective battery.

In accordance with the fifth embodiment as described above, an advantage is realized in that the capacity of the individual discharge power source can be restricted to a point of being just sufficient for correcting the variation in the capacity of a respective battery.

Figure 12:
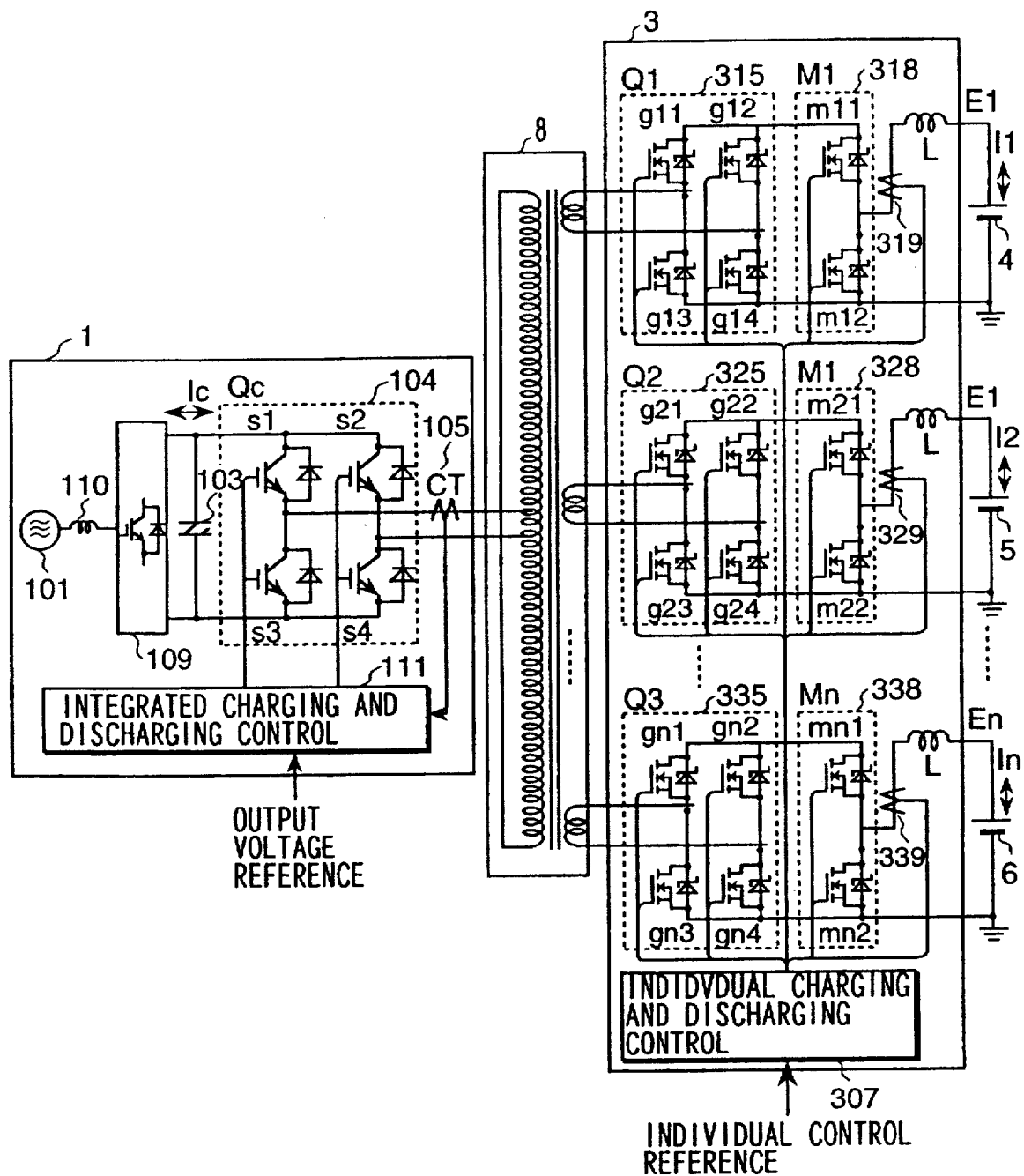
FIG. 12 is a wiring diagram indicating the composition of the charge and discharge power source of a sixth embodiment.

The composition of a sixth embodiment of the present invention is illustrated in FIG. 12. The sixth embodiment differs from the third embodiment in the composition of the transformer 8 and in the addition of bidirectional chopper circuits 318, 328, 338, which are connected between a respective converter, such as 315, and a respective battery, such as 4, to the individual AC/DC converting means 3.

Here, the transformer 8 has a composition, wherein plural secondary windings are connected in parallel and coupled to the primary winding. The transformer 8 is connected in a multi-parallel manner, instead of the multi-series connection of the transformer 2. In accordance with the present embodiment, an AC output voltage of the full bridge converter 104 is output in parallel to the plural secondary windings during the charging operation. Here, an output voltage reference is provided to the full bridge converter 104, and an AC output voltage is output according to the reference.

The individual AC/DC converter 3 regulates the charge and discharge operations of the individual batteries, respectively, as the respective output voltage from the transformer 8 is taken as an input. On the other hand, during the discharging operation, the full bridge converter 104 operates as a rectifying diode bridge by turning the gate signal off to each respective IGBT element. The discharging current of each respective battery is converted to AC by the individual AC/DC converter 3, and connected in parallel by the transformer 8. The discharging current from a respective battery is incorporated and regenerated at the ballast capacitor side 103 by the operation of the rectifying diode of the full bridge converter 104, and the electric power is regenerated at the commercial power source 101 by the regeneration converter 109.

Figure 13:
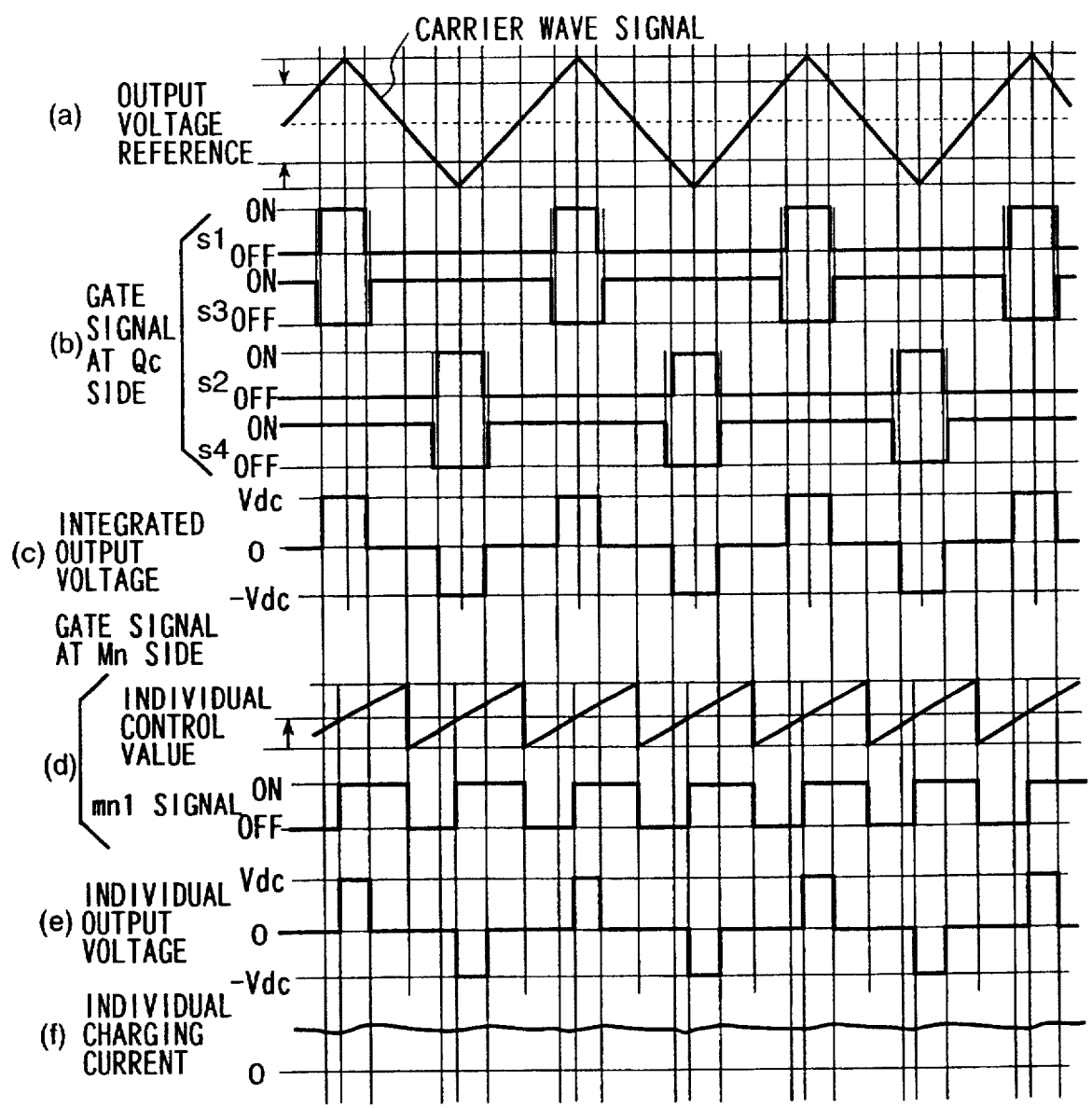
FIG. 13 is a waveform diagram indicating an operation waveform of the charge and discharge power source of the sixth embodiment.

The operation waveforms for the charging operation of the present embodiment are indicated in FIG. 13. The operations from FIGS. 13(a) to (c) are the same as in the cases of the multi-series connection system in the embodiments 1–5, but the output voltage reference to the full bridge converter 104 is given directly as the output voltage reference. Here, the output voltage reference is set in accordance with the value of the respective battery voltages. That is, because the battery voltage is small at the initial stage of the charging operation, the output voltage reference to the full bridge converter 104 is set to be small, and the output voltage reference becomes large near the time of full charging. On the other hand, the individual charge and discharge controller 307 detects the charging and discharging current of each battery using the current detecting means 319, 329, 339 of the respective battery, and regulates the gate signals m11, m21, . . . , mn1, of the power MOSFET at the positive side arm of the bidirectional chopper circuits 318, 328, 338. The operation waveform in this case is indicated in FIG. 13(d). That is, an individual controlling value is calculated as the result of operating the individual charge and discharge controller 307 for the respective battery, and the signals m11, m21, . . . , mn1 are obtained by comparison in level with the saw-teeth waves. Accordingly, during the period when the signals m11, m21, ..., mn1 are "off", the charging voltage of the respective battery can be corrected, because the AC voltage generated by the full bridge converter 104 is "off". The waveform of the AC output during this period is indicated in FIG. 13(g). The duty of the AC voltage is corrected as much as the individual correcting value indicated in FIG. 13(f) to the output voltage of the full bridged converter indicated in FIG. 13(c).

By performing the correction for each respective battery, the charging current to a respective battery is compensated to maintain the desired value by correcting the variation in the respective battery voltage, the variation in the voltage share of the transformer, and others. The waveform of the individual charging current during this period is indicated in FIG. 13(f). Accordingly, the current which flows to the plural secondary side circuits, which are connected in a multi-parallel manner, can be controlled to be a definite value via the transformer as indicated in the present embodiment. Even in the case of correcting the charging current to the respective battery, the charging current of the respective battery can be controlled using the voltage regulating function of the bidirectional chopper circuits 318, 328, 338.

Figure 14:
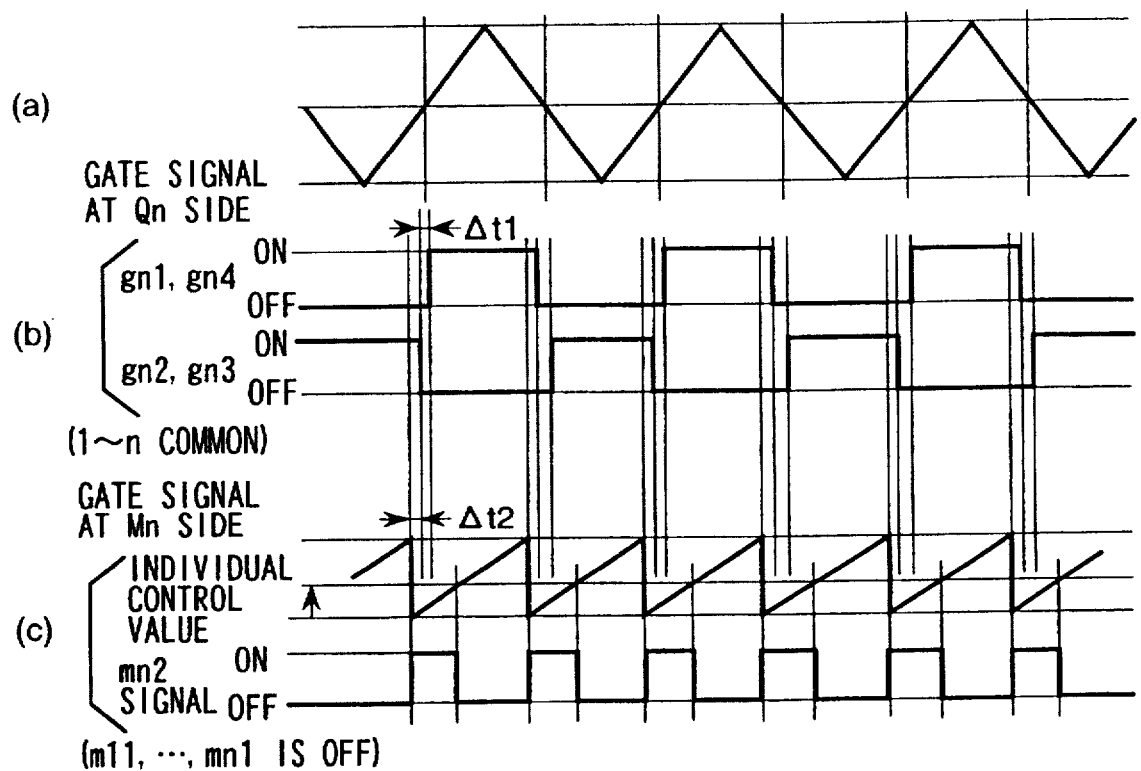
FIG. 14 is a waveform diagram indicating an operation waveform of the charge and discharge power source of the sixth embodiment.

On the other hand, the operation waveform during the discharging operation is indicated in FIG. 14. The main difference from the third embodiment of the present invention indicated in FIG. 8 is that the full bridge converter 104 operates as a rectifying diode bridge and regulates the discharging current of the respective battery by individual control of the individual battery with the individual AC/DC converter 3. Here, during the discharging operation, the battery voltage is decreased by performing on/off operation of the gate signals m12, m22, ..., mn2 at the lower side arm of the bidirectional chopper circuits 318, 328, 338 provided to the AC/DC converting means 3. Accordingly, the discharging voltage of a respective battery can be controlled. The operation waveform during this period is indicated in FIG. 14(c). Here, the individual controlling value to establish the duty of the gate signals, m12, m22, mn2 is calculated as a result of operating the individual charge and discharge controller 307 for controlling the discharging current. As a result, discharging as a unit can be performed by operating the rectifying diode of the full bridge converter 104, and the discharging current can be controlled by the gate signals m12, m22, ..., mn2 at the lower arm of the bidirectional chopper circuits 318,328, 338 to a desired definite value, even if the battery voltage is varied.

In accordance with the fifth embodiment of the present invention as described above in detail, an advantage is realized in that the charge and discharge circuit can be composed simply, because plural batteries which are connected in a multi-parallel manner via the transformer can be charged or discharged as a unit. Furthermore, an advantage is realized in that the number of transforms to be provided is not necessarily proportional to the number of secondary windings, because transformer in which plural secondary windings are connected to the primary winding in a multi-parallel manner can be composed in an incorporated manner with the magnetic core. Thus, an advantage is realized in that the charging current and the discharging current of a respective battery can be controlled in accordance with a desired reference, and can be compensated individually, by providing the bidirectional chopper circuits to for respective secondary circuits A method of manufacturing secondary batteries will be explained hereinafter as an embodiment of the present invention. In accordance with a process of manufacture of the secondary battery, initial charging, initial discharging, and aging are performed on the battery after assembling.

An outline of the manufacturing process for a non-aqueous electrolyte secondary battery will be explained hereinafter. The secondary battery is generally assembled by the steps of: applying a positive electrode active material and a negative electrode active material onto designated respective foils; winding the foils while interposing a separator therebetween; inserting the wound foils into a designated container; filling the container with an electrolyte; and sealing the container for completing the assembling.

As the positive electrode, lithiated cobalt oxide, a carbon material group conducting agent, and others are mixed and solved into an organic solvent to form a paste, and the mixed agent is applied onto both sides of the aluminum foil. After drying, the foil is compressed by a roller. As the negative electrode material, carbon or graphite is used. The carbon or the graphite mixed with a binder is kneaded to form a paste, which is adhered to a copper foil, and wound into a roll. Then, both electrodes are wound while interposing a separator between them in a winding step, and cut. The wound electrodes are inserted into a battery container, an electrolyte is poured into the battery container after welding a sealing cap, and the assembling steps of the battery main body are completed by sealing the cap.

The battery, after the assembling, is treated with initial charging and discharging, and aging, which means standing still under a charged condition. That is, the battery after assembling is charged and discharged. After charging the battery initially to a designated voltage, the battery is discharged to a designated voltage, and subsequently retained for a period of time in the charged state. Accordingly, a method of manufacturing the non-aqueous electrolyte secondary battery, which is capable of confirming the capacity of the battery, and of suppressing deterioration of the charge and discharge cycle of the battery after aging is provided.

The initial charge and discharge apparatus of the present invention has an advantage in that the charge and discharge operations can be controlled simultaneously as an unit. The charging and discharging characteristics of a large number of the batteries is determined as explained hereinafter. At the initial charging, plural batteries for testing are attached to the charge and discharge apparatus. The charge and discharge apparatus supplies charging current to the plural batteries in accordance with a designated charging current reference. During the charging, respective battery voltages are measured by the voltage detecting means of the charge and discharge apparatus. A bypass circuit for the charging current is composed operate on the batteries in an orderly manner, when the individual battery voltage of which has reached the designated set voltage. The current reference to the respective battery is made variable by the battery voltage with an incorporated charging current. Here, the charging current has a definite value at the incorporated inverter side, and the charging is continued until the charging of the last battery is completed while separating in order the other batteries, for which charging has been completed, from the charging circuit. Accordingly, during the charging operation or the discharging operation, incorporated discharging control under a condition that the battery voltage is maintained at a definite value becomes possible.

After charging plural batteries to a designated voltage, the initial charging is finished. Then, a discharge of the plural batteries is continued as an initial discharging until the voltage of the respective batteries is decreased to a designated voltage. The discharging current reference at this time is determined to make the discharging current common to all the batteries during the discharge. However, the time to reach the discharge finishing voltage of the respective batteries differs from battery to battery, even if an equal discharging current is used for the discharge, based on variation in battery capacity and the like. In this case, like the individual separation during the charging operation, the battery of which discharge is completed by reaching a designated discharge finishing voltage is separated in order from the incorporated discharging condition during the discharging operation. The separation can be performed by switching on the bypass circuit at the individual converter side to make the discharging current bypass the objective battery, and accordingly, the discharge of the respective batteries can be completed when the designated discharge finishing voltage is reached. After finishing the incorporated charge and discharge treatment, the batteries are separated from the charge and discharge circuit, and an aging treatment is performed. The charge and discharge treatment is completed by charging the battery voltage, which has decreased during the aging treatment, to a designated voltage.

In accordance with the charge and discharge apparatus or the method based on the present invention as explained above in detail, the incorporated initial charge and discharge treatment and aging treatment become possible in the manufacturing process.

Figure 15:
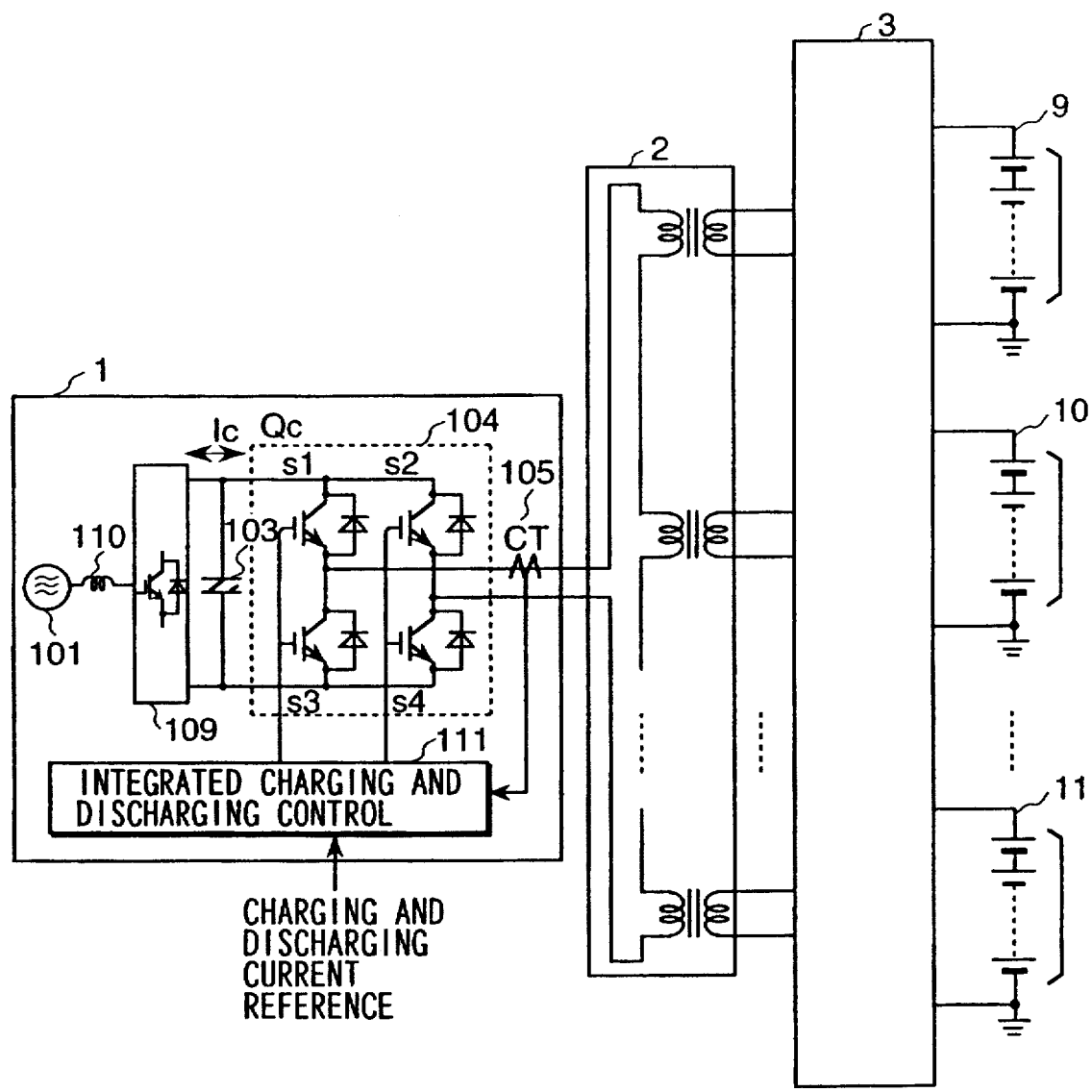
FIG. 15 is a wiring diagram indicating the composition of the charge and discharge apparatus for a set of batteries, according to an embodiment of the present invention.
Figure 16:
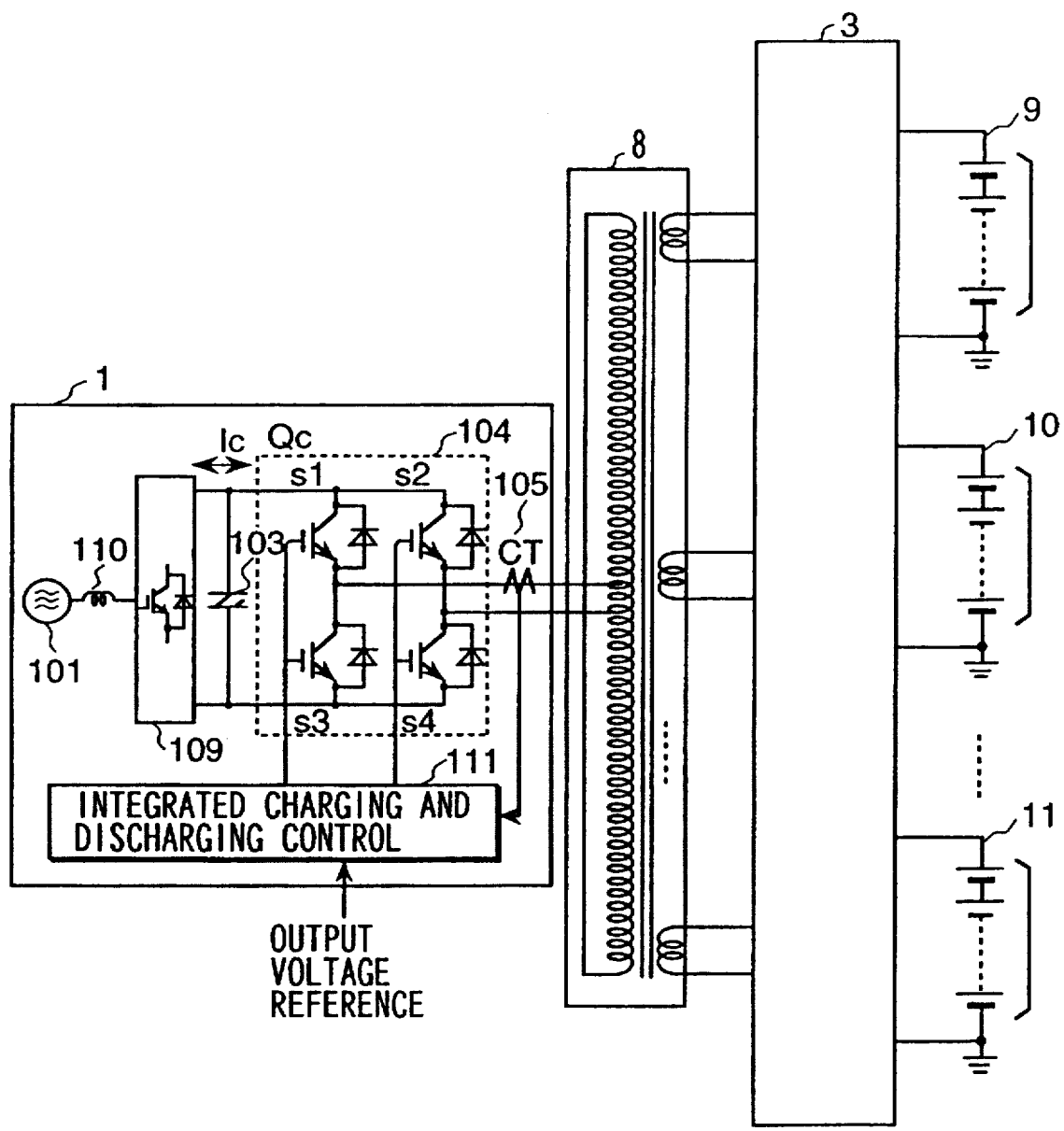
FIG. 16 is a wiring diagram indicating the composition of the charge and discharge apparatus for a set of batteries, according to an embodiment of the present invention.
Figure 17:
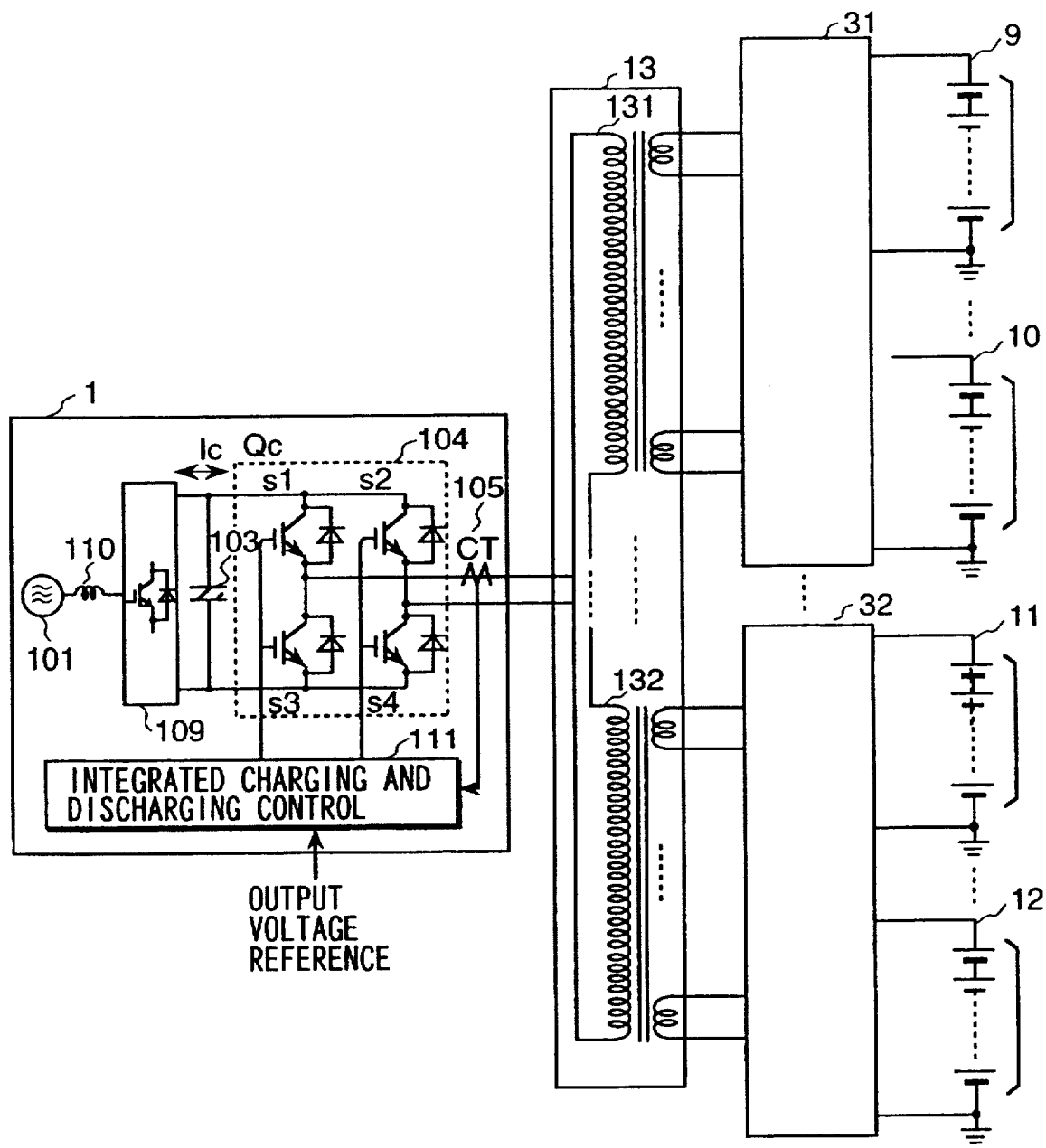
FIG. 17 is a wiring diagram indicating the composition of the charge and discharge apparatus for a set of batteries, according to an embodiment of the present invention.

As embodiments of the present invention, a charge and discharge apparatus for a set of batteries connected in multi-series are indicated in FIGS. 15, 16, and 17. The composition of the charge and discharge apparatus is the same as any one of the embodiments explained previously, but differs in charging and discharging a set of batteries instead of a unit battery. In accordance with the embodiment indicated in FIG. 15, sets of batteries are connected in a multi-series manner via the transformer 2, and the sets of batteries are charged and discharged simultaneously as a unit by the full bridge converter 104. In accordance with the embodiment indicated in FIG. 16, sets of batteries are connected in a multi-parallel manner via the transformer 8, and the sets of batteries are charged and discharged simultaneously as a unit by the full bridge converter 104. In accordance with the embodiment indicated in FIG. 17, sets of batteries connected in a multi-series manner are connected in a multi-parallel manner via the transformer 13, and the sets of batteries are charged and discharged simultaneously as an unit by the full bridge converter 104. As explained above, an advantage is realized in that plural sets of batteries can be charged and discharged by a simple composition by charging and discharging them simultaneously as a unit via the transformer even if the object is sets of batteries which are each composed of unit batteries connected in a multi-series manner.

Figure 18:
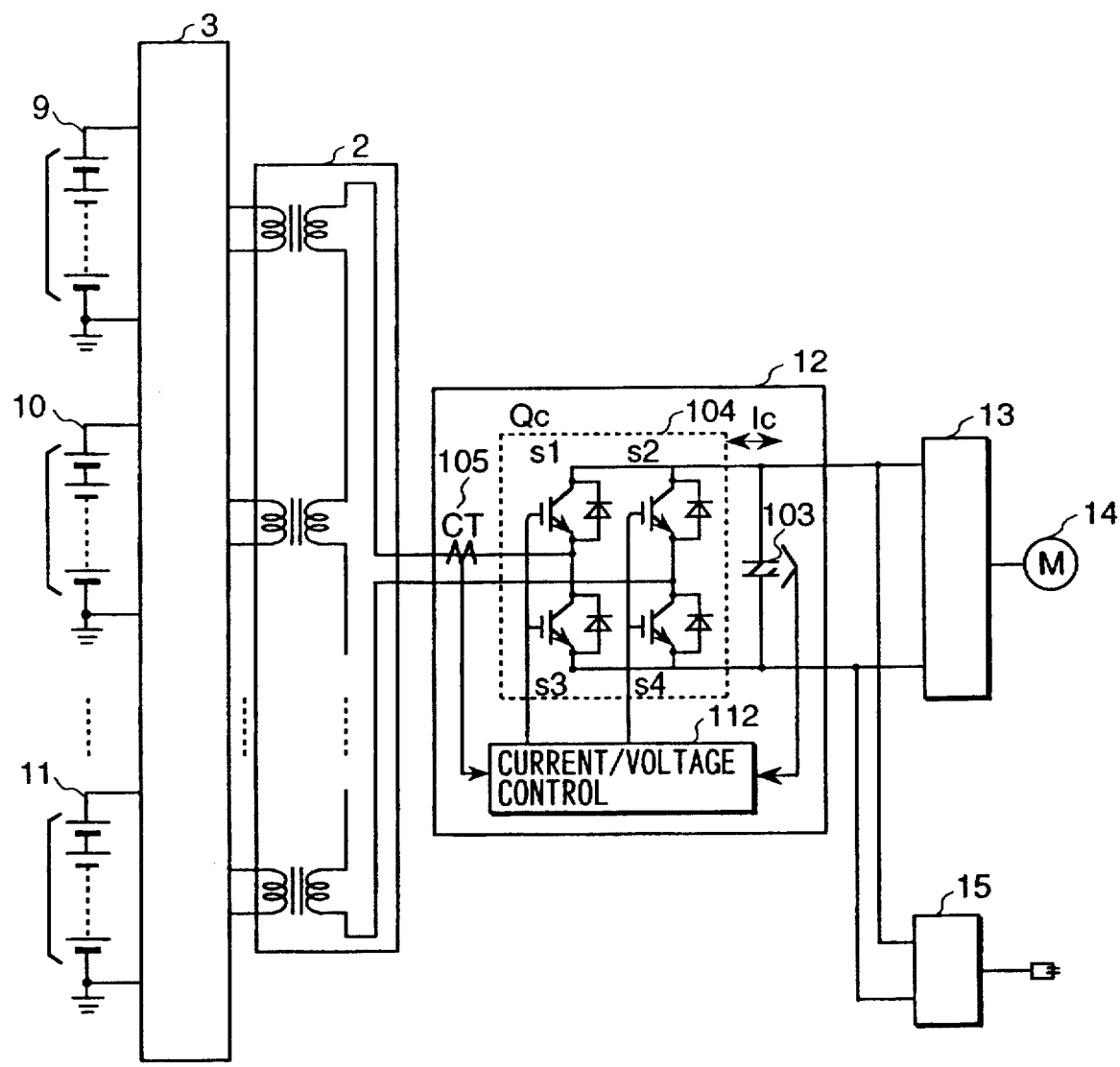
FIG. 18 is a wiring diagram indicating an example of application of the present invention to an electric vehicle, according to an embodiment of the present invention.
Figure 19:
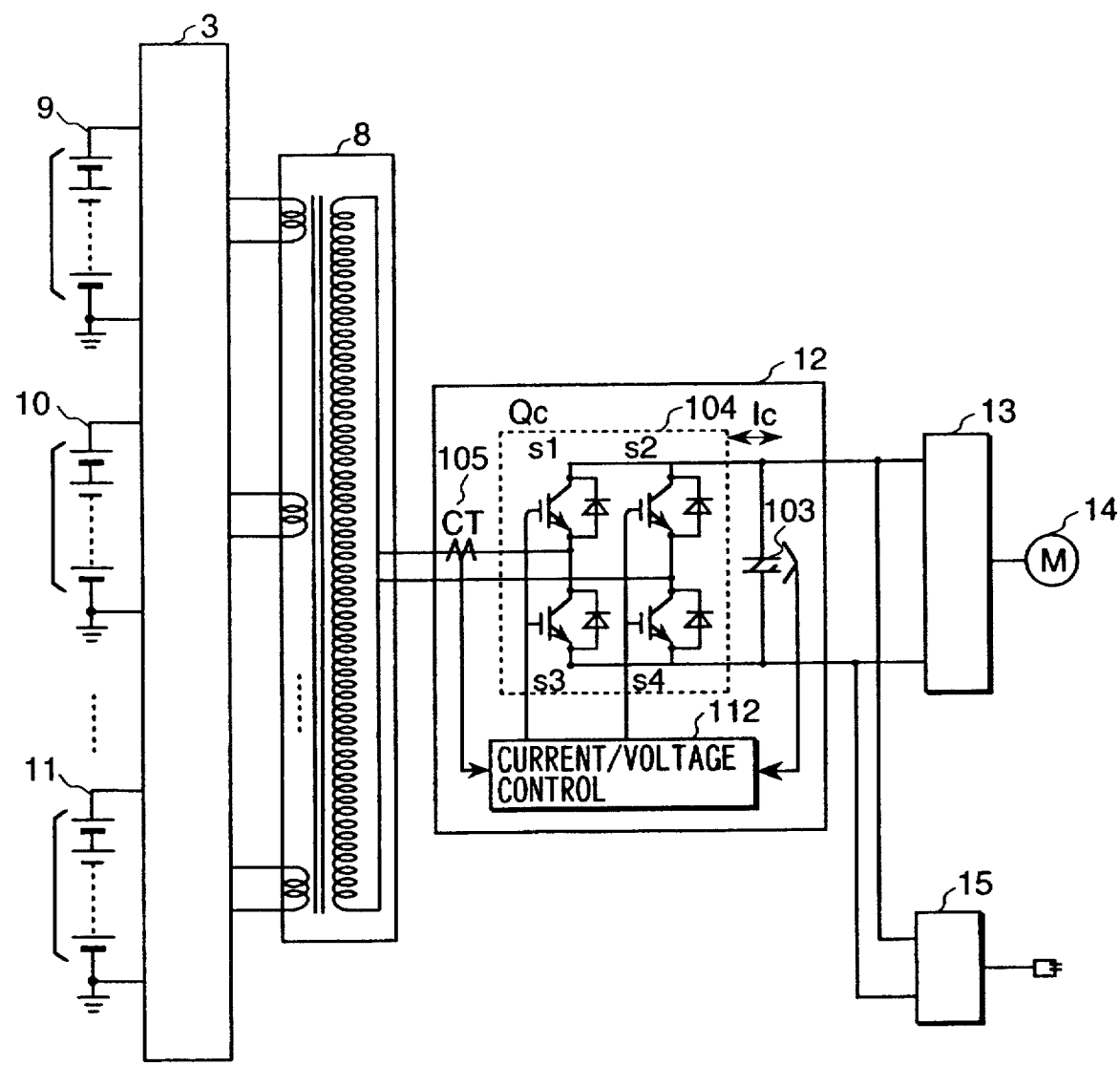
FIG. 19 is a wiring diagram indicating an example of application of the present invention to an electric vehicle, according to an embodiment of the present invention.

As other embodiments of the present invention, examples of application of the present invention to electric vehicles are illustrated in FIG. 18 and FIG. 19. In accordance with FIG. 18, plural sets of batteries 9, 10, 11 are connected in a multi-series manner via the transformer 2. The electric vehicle is driven by supplying electric power of the batteries to an induction motor via the inverter 12 and the inverter 13, which is connected to a DC side of the converter 12, and by discharging energy of the sets of batteries using the incorporated converter 12. On the other hand, the respective batteries are charged by supplying a DC voltage to the incorporated converter 12 from the charger 15 and a charging current is supplied to the respective battery from the incorporated converter 12 via the transformer 2. FIG. 19 indicates a case wherein the sets of batteries are connected in a multi-parallel manner via the transformer 8. In accordance with the present embodiment, an advantage is realized in that the sets of batteries can be managed separately, and can be changed individually, because plural sets of batteries are combined together in an insulated condition with respect to each other and charging and discharging can be performed simultaneously as an unit. Furthermore, by separating the sets of batteries, an advantage is realized in that the voltage and total capacity of the set of batteries can be-restricted.

The embodiments indicated in FIG. 18 and FIG. 19 can be applied not only to electric vehicles, but also to various induction motor driving systems. The system of the present embodiment can be applied not only to induction motors, but also to motors driven by an inverter, such as brushless motors and the like.

Figure 20:
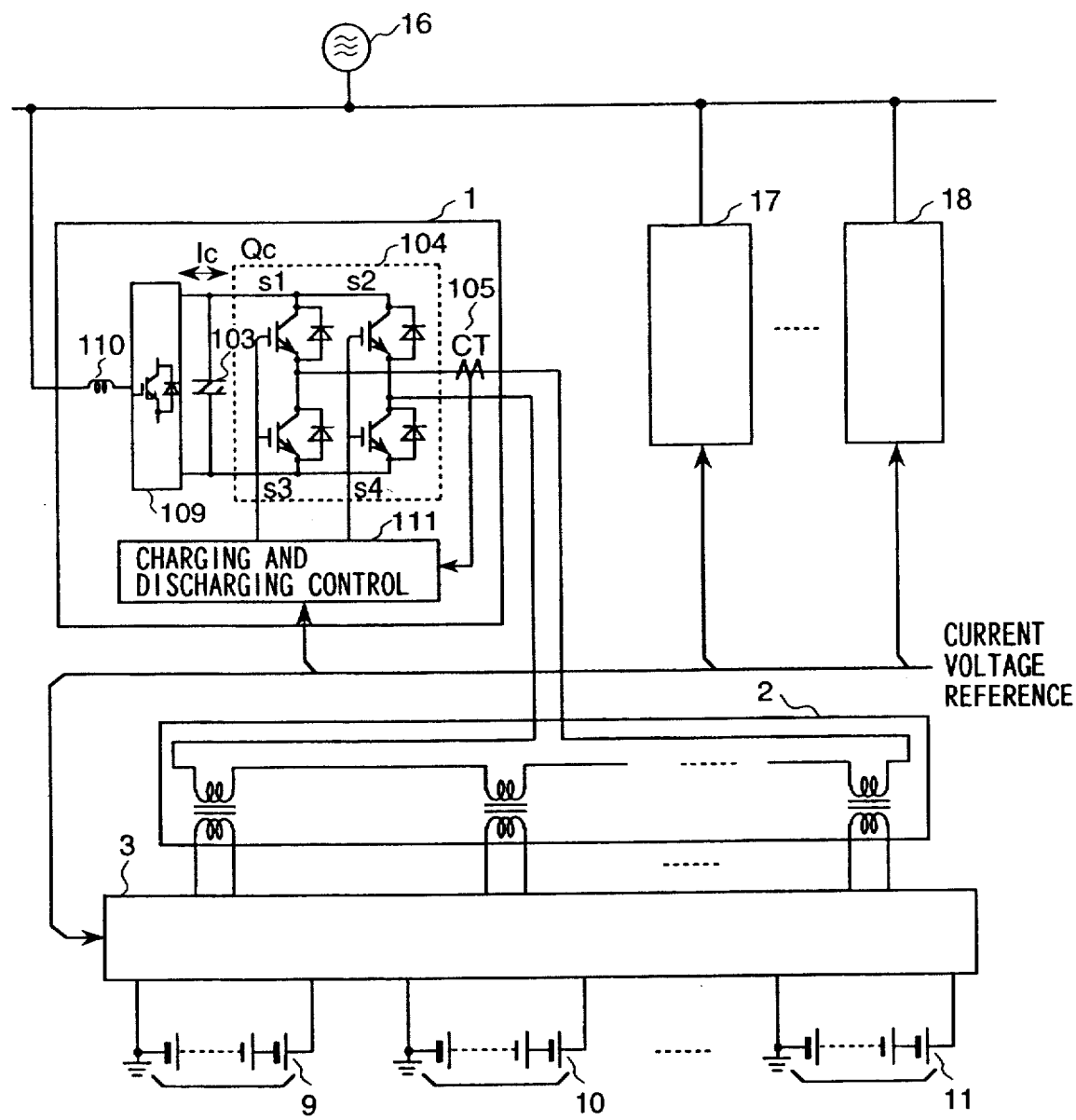
FIG. 20 is a wiring diagram indicating an example of application of the present invention to an electric power storage system, according to an embodiment of the present invention.
Figure 21:
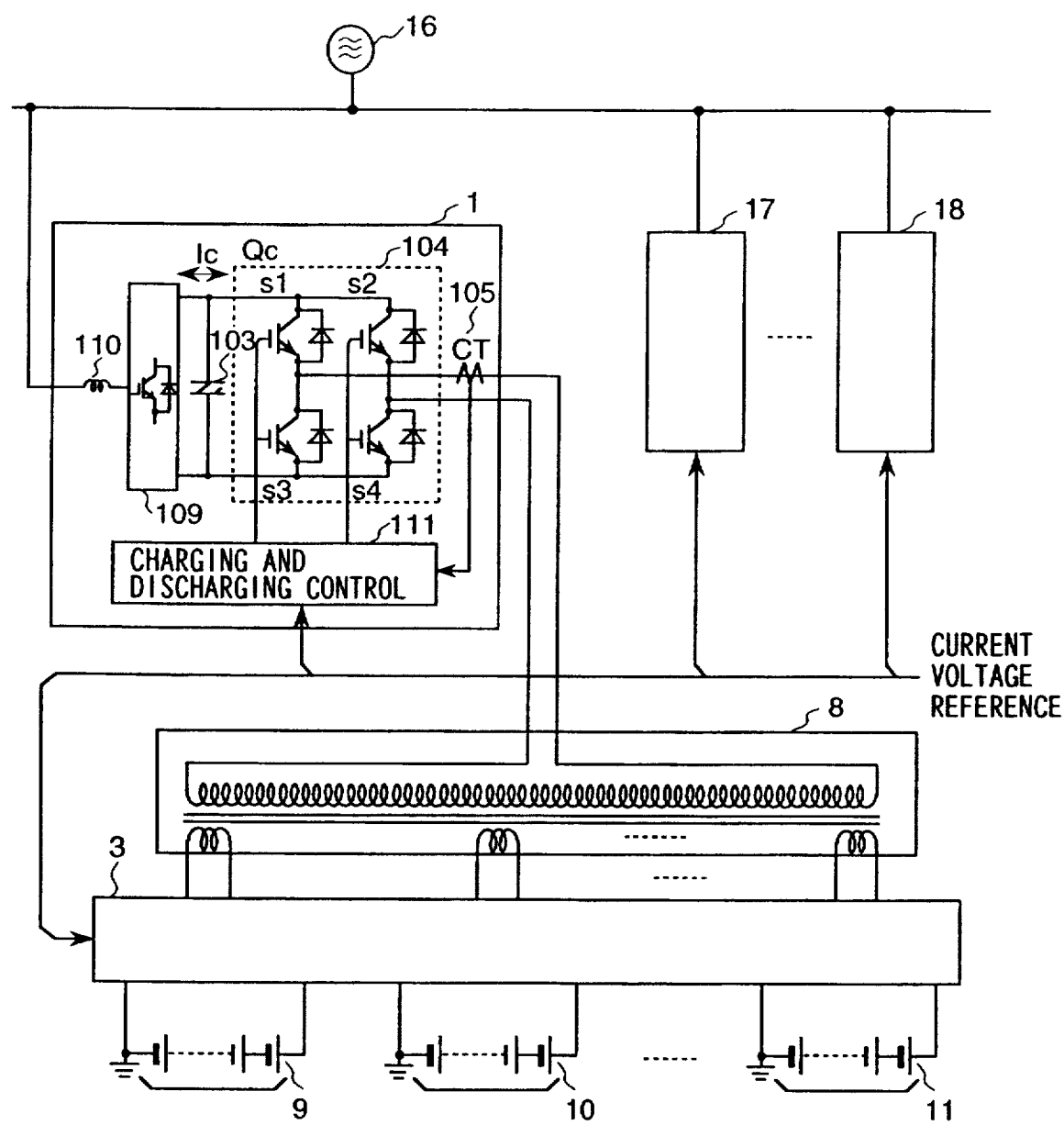
FIG. 21 is a wiring diagram indicating an example of application of the present invention to an electric power storage system, according to an embodiment of the present invention.

Examples of applying the present invention to an electric power storage apparatus are indicated in FIG. 20 and FIG. 21, which represent other embodiments of the present invention. In accordance with FIG. 20, sets of batteries 9, 10, 11, i.e. an electric power storage means, are combined in a multi-series manner via the transformer 2, and are connected to the electric power system 16 via the incorporated converter 1. FIG. 21 is directed to a case wherein the sets of batteries are combined in a multi-parallel manner via the transformer 8. In accordance with the present embodiments, the respective sets of batteries are arranged separately, and an advantage is realized in that the sets of batteries are readily changeable.

In accordance with the present invention, plural batteries including at least two batteries, or sets of batteries, can be charged and discharged simultaneously as a unit. Therefore, a charge and discharge apparatus can be composed with a more simple composition, in comparison with a case in which a unit battery or a set of batteries is charged and discharged individually with an individual charge and discharge power source. In the incorporated charging, batteries can be charged or discharged under a condition wherein the batteries are connected in a multi-series manner or a multi-parallel manner. Therefore, the batteries can be charged or discharged under a condition wherein the output voltage of the converter for charging and discharging is maintained at a high voltage. Accordingly, an advantage is achieved in that the current capacity of the power elements composing the converter and the copper loss caused by the current flowing through the converter can be made small, and an effective charge and discharge power source can be composed.

Figure 22:
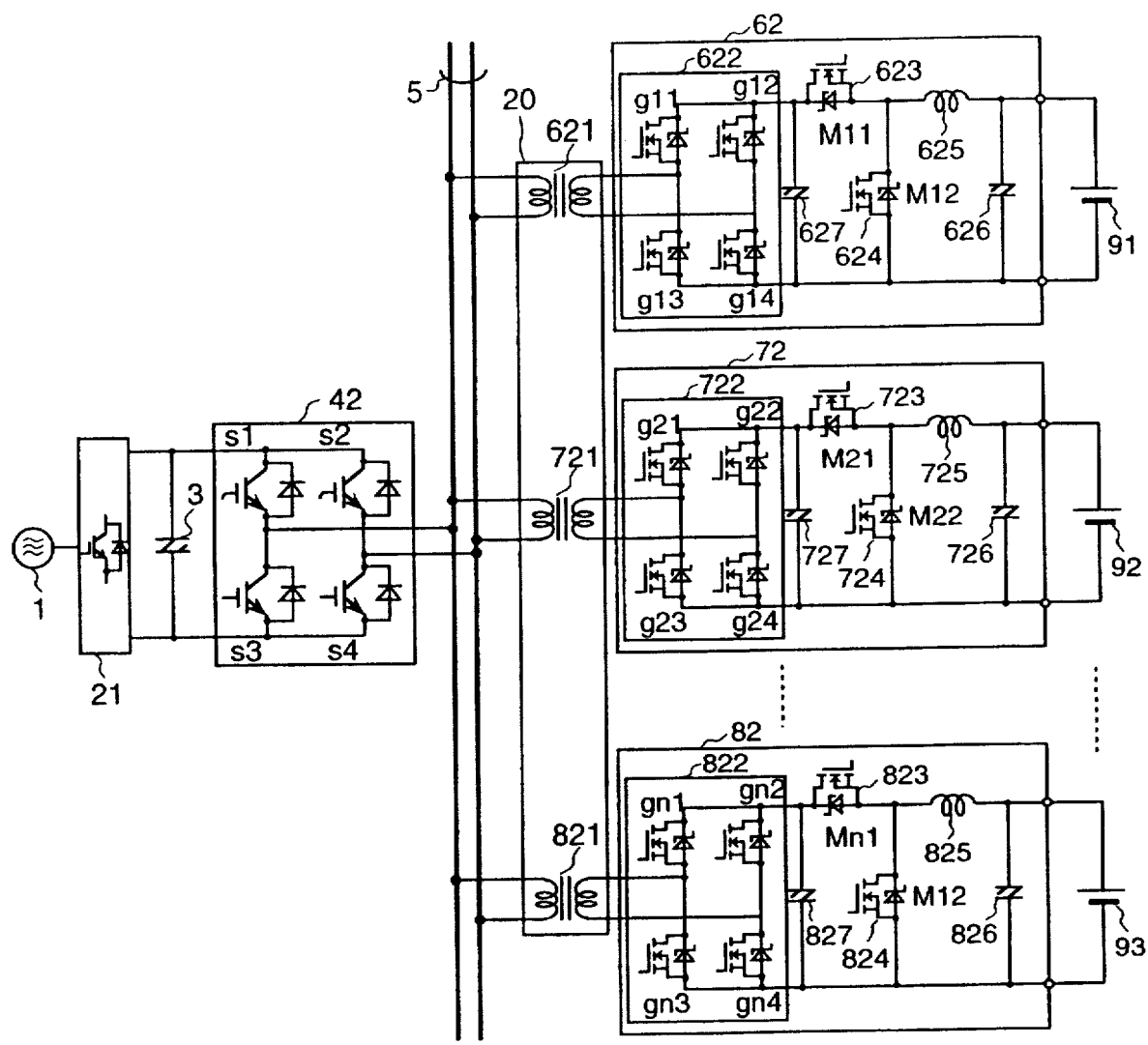
FIG. 22 is a wiring diagram indicating an embodiment of the present invention, wherein plural transformers are used as a transforming apparatus.

An embodiment of the present invention is indicated in FIG. 22. The apparatus of FIG. 22 includes a commercial power source 1, a power regeneration converter 21, a ballast capacitor 3, full bridge converter 42, distributing wiring of a high frequency voltage 5, n of electric power converting portions 62, 72, 82, and n secondary batteries 91, 92, 93 to be charged or discharged. One electric power converting portion 62 is composed of a high-frequency transformer 621, a full bridge converter 622, a ballast capacitor 627, chopper circuits 623, 624, a reactor 625, and a capacitor 626. The other electric power converting portions 72, 82 are composed in a similar manner. Here, the full bridge converter 42 is composed of an IGBT switches S1, S2, S3, S4, each of which has a diode connected in parallel therewith. The full bridge converter 622 is composed of power MOSFET and switches G11, G12, G13, G14, each of which has a diode connected in parallel therewith. Respective ones of the chopper circuits 623, 624 are also composed of power MOSFET switches M11, M12, each of which has a diode connected in parallel therewith. The full bridge converters 722, 822, the chopper circuits 723, 724, and the chopper circuits 823, 824 are composed in a same manner.

The embodiment illustrated in FIG. 22 will be explained in detail hereinafter. The present embodiment is an electric power converting device which converts a DC voltage obtained by rectifying an AC voltage supplied from the commercial AC power source 1 by means of the regeneration converter 21 and by smoothing with the ballast capacitor 3 to obtain a high frequency voltage. The full bridge converter 42, which is connected to the AC power source, is connected to the distribution wiring (high frequency wiring portion) 5. The distributing wiring is connected to the primary winding of the transforming apparatus 20 including plural transformers, that is, high frequency transformers 621, 721, 821. The primary winding is composed by connecting the primary side windings of the plural high frequency transformers, 621, 721, 821, in parallel via the distribution wiring 5. The secondary windings of the respective high frequency transformers are plural secondary windings of the transforming apparatus 20. Plural electric power converting portions 62, 72, 82 are connected to respective ones of the plural secondary windings. In accordance with the present embodiment, an electric power converting portion is connected to each of the plural secondary windings. The electric power converting portion 62 comprises: the full bridge converter 622, the AC side of which is connected to the secondary winding of the high frequency transformer 621, for converting a high frequency voltage transmitted from the high frequency transformer 621 to a DC voltage; ballast capacitor 627 and chopper circuits 623, 624, which are connected to the DC side of the full bridge converter 622; and the reactor 625 and the capacitor 626, which are connected to the full bridge converter 622 via the ballast capacitor and chopper circuits 623, 624. The composition of the other electric power converting portions 72, 82 are the same as the composition of the electric power converting portion 62.

An operation for charging n secondary batteries 91, 92, 93 will be explained hereinafter.

In this case, the full bridge converter 622 of the electric power converting portion 62 operates as a rectifying diode bridge circuit, and respective of the chopper circuits 623, 624 each operate as a chopper circuit for decreasing the voltage. The electric power converting portions 72, 82 operate in the same manner as the above electric power converting portion 62. The AC input from the commercial AC power source 1 is rectified by the regeneration converter 21, and is converted to a DC voltage by the ballast capacitor 3. The full bridge converter 42 converts the DC voltage from the ballast capacitor 3 to a high frequency voltage. The high frequency voltage is supplied to each of the electric power converting portions 62, 72, 82 by the high frequency voltage distribution wiring 5. The electric power converting portion 62 converts the input high frequency voltage to a DC voltage by diode rectifying operation of the full bridge converter 622.

On the other hand, the chopper circuits 623, 624 are operated as chopper circuits for decreasing the voltage by turning the switch M12 of the chopper circuit 626 "off", and controlling the switch M11 of the chopper circuit 623 with on/off control. The output voltage can be made high by making the "on" period of the switch M11 long, and the output voltage can be made low by making the "on" period thereof short. The output voltage is smoothed by the reactor 625 and the capacitor 626 for controlling the charge of the secondary battery 91. Similarly, the charge of the secondary batteries 92 and 93 are controlled by the electric power converting portions 72 and 82, respectively.

Figure 23:
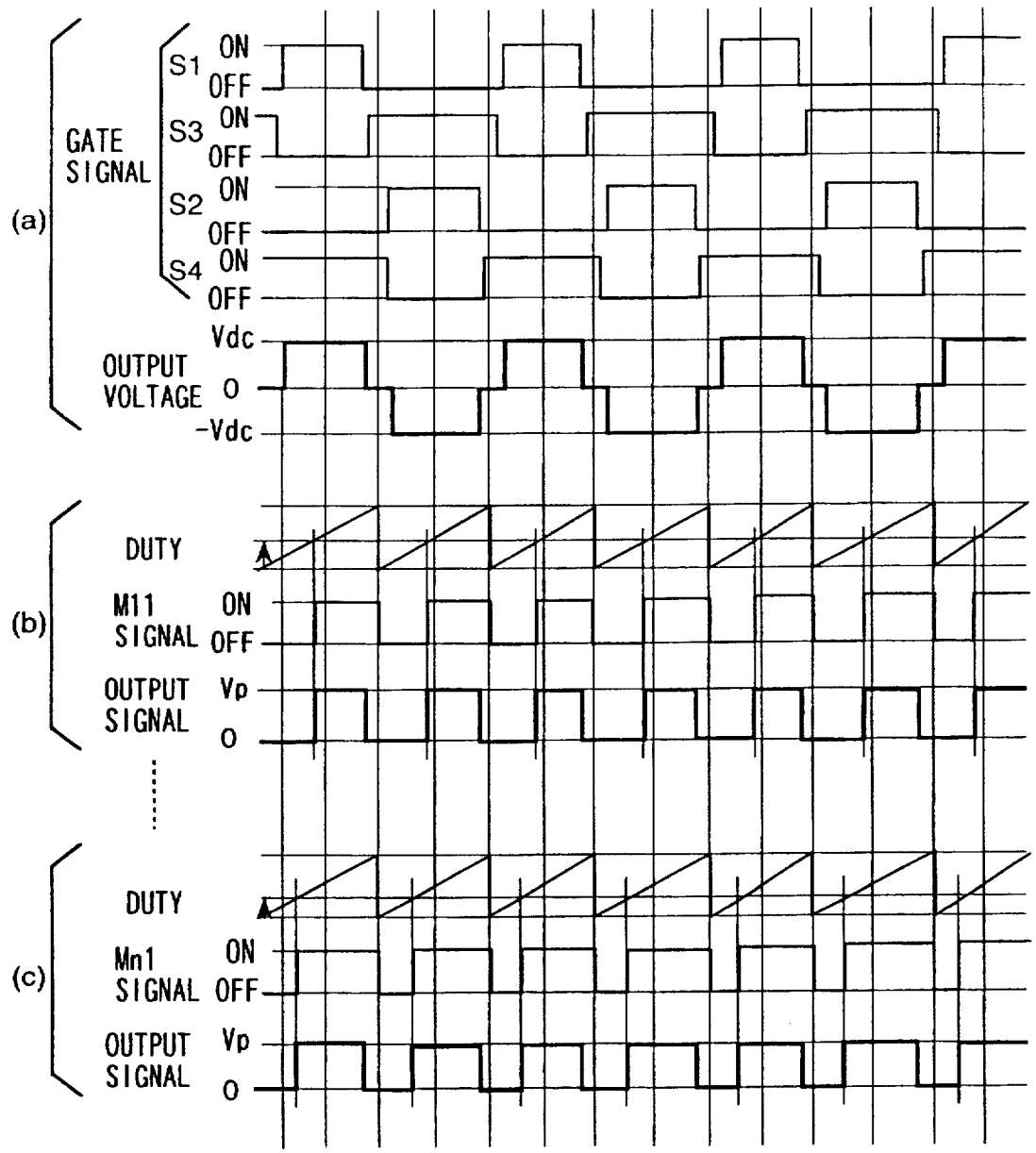
FIG. 23 is a waveform diagram indicating an operation waveform at the time of charging the secondary battery in the embodiment illustrated in FIG. 22.

The operating waveforms of the present embodiment are illustrated in FIG. 23. The gate signals to the switches S1, S2, S3, S4 in the full bridge converter 42 are shown in FIG. 23(a) Accordingly, an output voltage of the rectangular waveform can be obtained. When the gate signals are such that the frequency of the output voltage becomes 20 kHz, the period of the output voltage becomes 50 µs. The high frequency voltage is supplied to n electric power converting portions 62, 72, 82 by the distribution wiring 5. At the electric power converting portions 62, 72, 82, the chopper circuits 623, 723, 823 are controlled by on/off control. The ratio of "on" period to the "off" period is defined the duty. By varying the duty of every electric power converting portion depending on the necessary output voltage, even if a definite AC voltage is input via the distributing wiring of the high frequency voltage, the output voltage can be controlled individually by each electric power converting portion. Examples of the operation waveform at this time are illustrated in FIGS. 23(b), (c). The example indicates a case in which the "on" period of the switch M11 is controlled to be shorter than the "on" period of the switch Mn1. The example indicates that the DC output can be controlled individually in each channel by controlling the high frequency voltage generated as a unit by the respective electric power converting portions 62, 72, 82. The distribution wiring 5 carrying the high frequency voltage is composed so that the wiring impedance becomes minimum in order to supply the same AC voltage to respective electric power converting portions.

Next, an operation for discharging n secondary batteries 91, 92, 93 will be explained. At this time, the chopper circuits 623, 624 of the electric power converting portion 62 operate as chopper circuits for increasing the voltage, the full bridge converter 622 operates as a full bridge inverter circuit, and the full bridge inverter 42 operates as a rectifying diode bridge circuit. The discharging electric power from n secondary batteries is controlled individually by connecting the n secondary batteries 91 92, 93 to both ends of the ballast capacitor 626, 726, 826 in the n electric power converting portions 62, 72, 82. The chopper circuits 623, 624 are operated as chopper circuits for increasing the voltage by turning the switch M11 of the chopper circuit 623 "off", and controlling the switch M12 with on/off control. The discharging current can be made large by making the "on" period of the M12 long, and the discharging current can be made small by making the "on" period thereof short. On the other hand, the full bridge converters 622, 722, 822 convert the voltage of the ballast capacitors 627, 721, 821 to AC in accordance with the same gate signal. The AC is input to the full bridge converter 42 via the high frequency transformers 621, 721, 821, and the distribution wiring 5 of the high frequency voltage. The full bridge converter 42 operates in a diode rectifying mode, and the output obtained by rectifying the high frequency voltage is output to the ballast capacitor 3. The regeneration converter 21 converts the voltage at the ballast capacitor 3 to AC, and regenerates power in the commercial AC power source 1.

Figure 24:
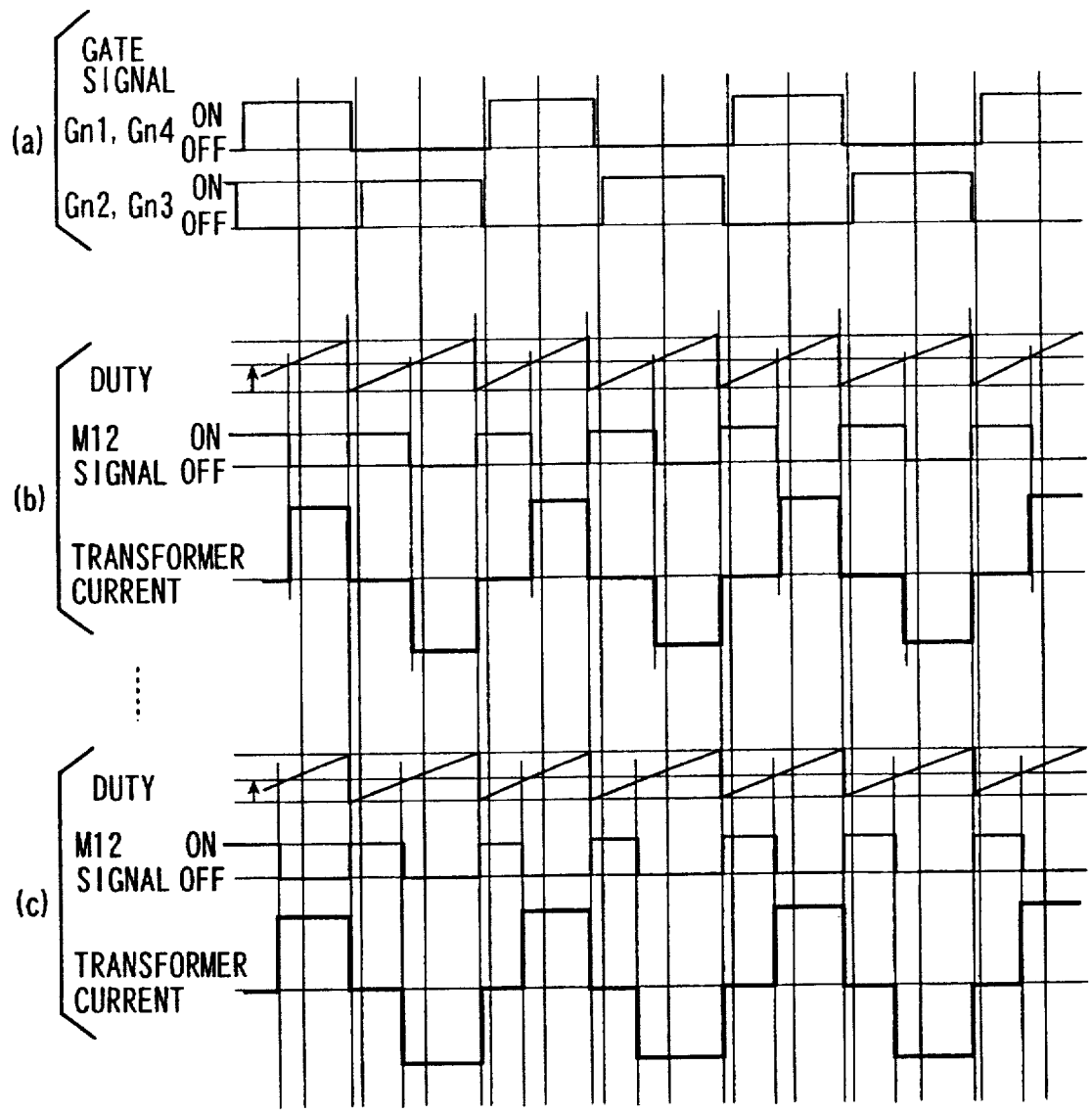
FIG. 24 is a waveform diagram indicating an operation waveform at the time of discharging the secondary battery in the embodiment indicated in FIG. 22.

The operating waveform of the present embodiment is illustrated in FIG. 24. The same gate signal is applied to the switches Gn1, Gn2, Gn3, Gn4 of the respective full bridge converter as indicated in FIG. 24(a). The chopper circuit for increasing the voltage of the respective electric power converting portion operates with independent duty as indicated in FIGS. 24(b), (c) in order to control the discharging current from the respective secondary batteries, individually.

As a result, an AC current varying positive/negative alternately flows from the respective electric power converting portion to the full bridge inverter side via the distribution wiring carrying the high frequency voltage. Accordingly, the discharging current from the respective secondary batteries is regenerated in the commercial AC power source 1.

In accordance with the present embodiment as described above in detail, advantages are realized in that the influence of the wiring impedance can be made minimum and the number of components can be decreased, because an AC voltage provided as a unit can be distributed to respective electric power converting portions by the distribution wiring 5 composed of parallel conductors, and the duty at the chopper circuit can be controlled in synchronism with the conversion to AC power at the full bridge converter 4. Furthermore, in accordance with the present embodiment, the number of components can be decreased in comparison with a case in which a means to convert to DC is provided to each of the electric power converting portions, because the discharging electric power is incorporated first as AC power and, then, is converted to DC power. The chopper control for controlling the discharging current can be performed in synchronism with switching of the full bridge converter for converting the output to a AC, as provided by the first embodiment. Therefore, an advantage is realized in that the circuit composition can be made simple.

An embodiment of the present invention will be explained hereinafter with reference to FIG. 25.

Figure 25:
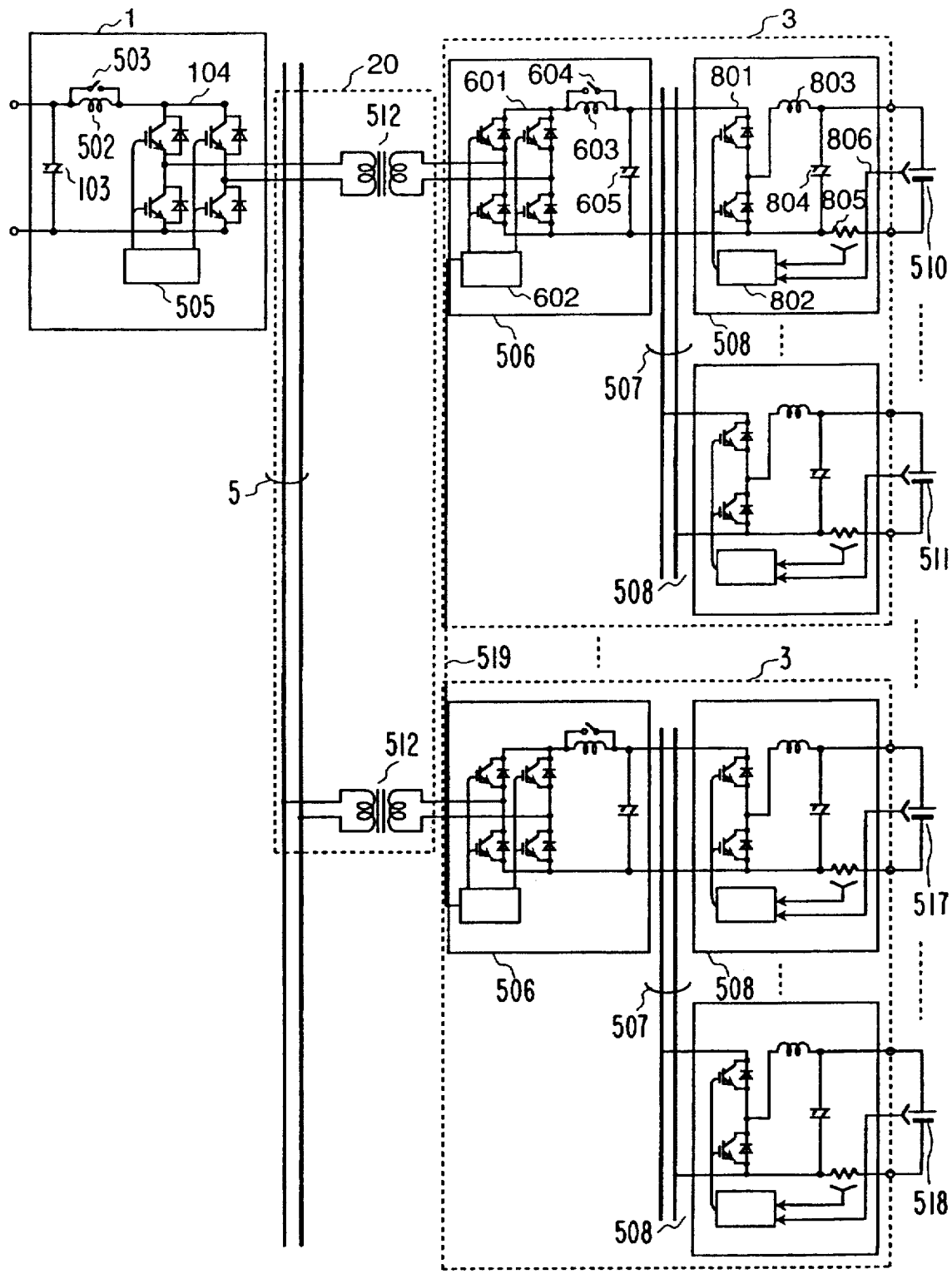
FIG. 25 is a wiring diagram indicating an embodiment of the present invention, wherein an electric power converter comprising plural chopper circuits is provided.

In FIG. 25, the full bridge converter 1, which is a power converter for converting a voltage of a DC power source to a high frequency voltage and operates as an AC power source, is connected to the high frequency wiring portion 5 composed of wiring for distributing the high frequency voltage. The high frequency wiring portion 5 is connected to the primary winding of the transformer apparatus 20, which includes plural transformers, i.e. plural high frequency transformers 12. The primary winding is formed by connecting plural windings at the primary side of the plural high frequency transformers 512 in parallel via the high frequency wiring portion 5. Respective windings at the secondary side of the high frequency transformers 512 forms plural secondary windings of the transformer apparatus 20. A plurality of electric power converting portions 3 are connected to the plural secondary windings in accordance with the present embodiment, each electric power converting portion is connected to a respective one of the plural secondary windings. The electric power converting portions 3 are substantially the same.

The electric power converting portion 3 comprises: the full bridge converter 506, the AC side of which is connected to the secondary winding of the high frequency transformer 512, and which operates as an electric power converting circuit for converting the high frequency voltage transmitted via the high frequency transformer 512 to a voltage of the DC voltage supply; the DC wiring portion 507 connected to the DC side of the full bridge converter 506, comprising wiring for distributing the voltage from the DC voltage supply converted by the full bridge converter 506; and two chopper circuits 508, connected to the DC side of the full bridge converter 506 via the DC wiring portion 507 for controlling charge or discharge operation of the electric power storage means 510, 511 by controlling the pulse width of the distributed voltage from the DC voltage supply. A plurality of the chopper circuits are connected appropriately. A plurality of the full bridge converters 6 can be connected in parallel. As the electric power storage means, a secondary battery, a set of batteries, wherein plural unit batteries are connected, and an electrical double layer capacitor are regarded as objects.

An apparatus, by which charge and discharge operations are performed bidirectionally on the electric power storage means, will be explained hereinafter.

Figure 26:
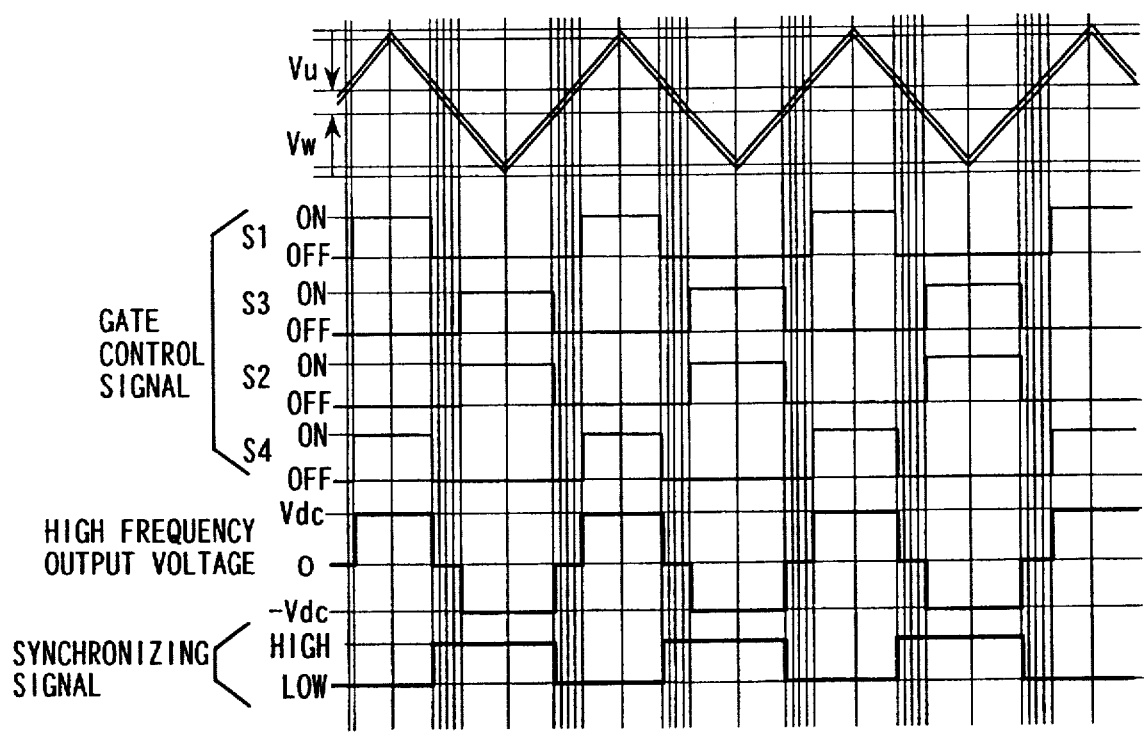
FIG. 26 is a waveform diagram indicating an operation waveform of the embodiment illustrated in FIG. 25.

The full bridge converter 1 comprises a ballast capacitor 103, a reactor 502, a shunt switch 503, a main circuit 104 comprising IGBT elements, and a gate control circuit 505. During a charging period of the respective electric power storage means 510, 511, 517 and 518, the shunt switch 503 is shunted, and the DC voltage from the ballast capacitor 103, which operates as a DC voltage supply, is converted to the high frequency voltage by the main circuit 104. On the contrary, during the discharging period of the respective electric power storage means, the main circuit 104 operates under a condition in which the diode rectifying bridge and the shunt switch 503 is open. The discharging power from the respective electric power storage means is regenerated in the input side via the reactor 502 and the ballast capacitor 103. A relationship between the gate control circuit 505 and the high frequency output voltage during charging is indicated in FIG. 26. As indicated in FIG. 26, the gate driving signals S1, S2, S3, S4 of the IGBT elements are obtained by comparing the triangular carrier signal having the same frequency as the output frequency of the full bridge converter 104 and signals indicating the positive side voltage instruction and the negative side voltage instruction. The high frequency output voltage indicated in FIG. 26 can be obtained by driving the IGBT elements of the full bridge converter 104 with the above signals.

The high frequency voltage generated by the full bridge converter 1 is distributed to plural converting portions 3 via the high frequency wiring portion 5.

Next, the operation of the converting portion 3 will be explained.

The high frequency voltage, which is decreased corresponding to the ratio of winding number of the transformer, is generated at the secondary side of the high frequency transformer 512. The full bridge converter 506 comprises a main circuit 601 composed of power MOSFET elements, a gate control circuit 602, a reactor 603, a shunt switch 604, and a ballast capacitor 605. During the charging period of the respective electric power storage means 510, 511, 517 and 518, the main circuit 601 operates under the condition that the diode rectifying bridge and the shunt switch 503 is open, and the output voltage from the high frequency transformer 512 is supplied to the ballast capacitor 605 via the reactor 603.

On the contrary, during the discharging period of the respective electric power storage means 510, 511, 517 and 518, the shunt switch 604 is shunted, the DC voltage from the ballast capacitor 605 is converted to a high frequency voltage by the main circuit 601, and its output is regenerated in the primary side by the high frequency transformer 512. The gate control signal during the discharging period becomes the same as the gate control signal of the full bridge converter 1 indicated in FIG. 26. Here, during the discharging period, the full bridge converter 506 is controlled by synchronized gate control signals. The synchronized signal during this period is indicated in FIG. 26, and transmitting lines for the synchronizing signals are indicated as 519 in FIG. 25.

Next, the DC voltage generated by the full bridge converter is distributed to the respective chopper circuits 508 via the DC wiring portion 507, and charge and discharge operations of corresponding electric power storage means 510, 511 are controlled. The chopper circuit 508 comprises a main circuit portion 801, a gate control circuit 802, a reactor 803, a capacitor 804, a shunt resistance 805, and an output voltage detector 806. During the charging operation of the electric power storage means 510, the power MOSFET element at the upper side arm of the main circuit is chopper-controlled, the chopper output voltage is converted to a DC voltage by the reactor 803 and the capacitor 804, and the DC voltage is supplied to the electric power storage means 510.

On the other hand, during the discharging operation of the electric power storage means, the power MOSFET element at the lower side arm of the main circuit is chopper-controlled, and discharging current from the electric power storage means is regenerated to the DC voltage supply side of the ballast capacitor 605 via the DC wiring portion 507. The charge or discharge operation of the electric power storage means is detected by the shunt resistance 805, the terminal voltage of the electric power storage means is detected by the output voltage detector 806, and the detected values are fed back to the gate control circuit 802. The gate control circuit 802 uses the feedback of these signals for controlling the chopper control duty to the main circuit element and for controlling the charging and discharging current or voltage to the electric power storage means.

In accordance with the present embodiment as explained above, for both charge and discharge of the respective electric power storage means, the chopper circuits 508 for controlling charge and discharge of the plural electric power storage means can be coupled via the insulated DC wiring portion 507 to the single full bridge converter 508. Therefore, even in a case when a large number of electric power storage means are charged or discharged, it is not necessary to provide an individual full bridge converter or a high frequency transformer for each of the electric power storage means. For instance, when 200 electric power storage means are charged or discharged simultaneously, 200 chopper circuits, the same as the number of objective electric power storage means, become necessary. However, if a high frequency transformer and a full bridge converter is provided respectively to each group of 10 chopper circuits, only 20 high frequency transformers and full bridge converters are necessary 200 electric power storage means.

The above explanation is directed to a case in which respective ones of the full bridge converter can convert the voltage of a DC voltage supply and a high frequency voltage, bidirectionally, and the chopper circuits provided for respective ones of the electric power storage means can accommodate both charge and discharge operations. However, the same advantage can be obtained even when the system is composed of circuits which can accommodate only charge or discharge operations.

In accordance with the present embodiment, a charge and discharge apparatus, wherein the number of components can be decreased and which has a preferable converting efficiency, can be provided.

Next, another embodiment of the electric power storage means indicated in FIG. 22 will be explained hereinafter with reference to FIG. 27.

In accordance with the present embodiment, DC sides of plural electric power converting portions are connected in series; terminals to be connected are provided at both ends of the series connection; and the electric power storage means is connected to the terminals.

Figure 27:
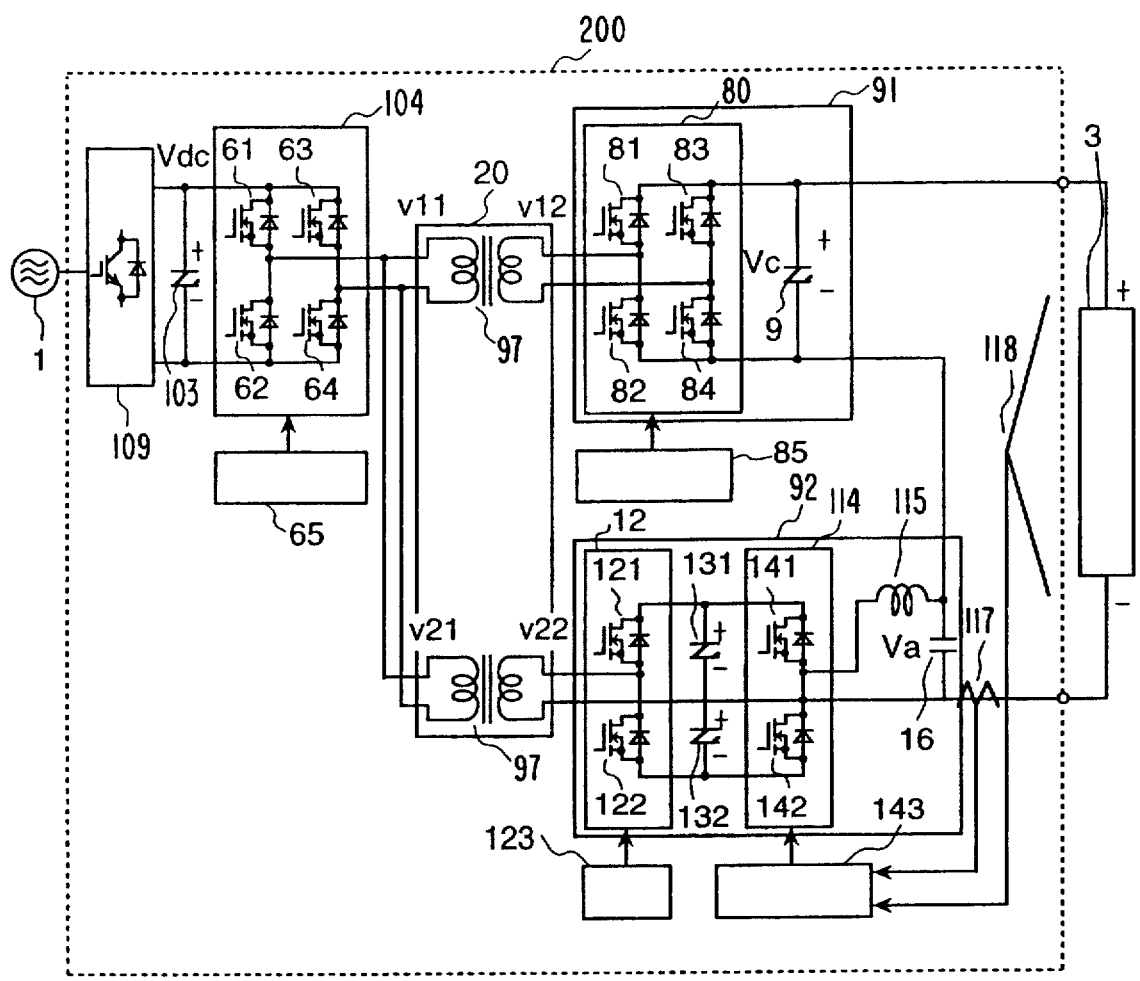
FIG. 27 is a wiring diagram indicating an embodiment of the present invention, wherein plural DC sides of the electric power converters are connected in series.

In FIG. 27, the apparatus includes a three phase AC power source 1, a DC power source 2, and an electric power storage means 300. The present embodiment will be explained for the case in which the electric power storage means comprises secondary batteries connected in multi-series, and wherein the electric power storage means is charged and discharged by the DC power source 200. The DC power source 200 comprises the three phase voltage type converter 109, the ballast capacitor 103, the full bridge converter 104, the high frequency transformer unit 20, the full bridge converter 80, the ballast capacitor 90, the high frequency transformers 97, the half bridge converter 120, the ballast capacitors 131, 132, the half bridge converter 114, the reactor 115, and the capacitor 116. When the voltage at the electric power converting portion 91 is expressed as vc, and the output voltage at the electric power converting portion 92 is expressed as Va, a sum of the Vc and Va is applied to the electric power storage means 300.

The three phase voltage type converter 109 is a three phase full bridge PWM (Pulse Width Modulation) converter having an IGBT as the switching elements, and it is controlled so that the voltage Vdc of the ballast capacitor 103 is constant. When the effective line voltage at the three phase AC power source is 200 V, the DC voltage Vdc at the ballast capacitor 103 is set at 350 V. When electric power is output from the ballast capacitor 103 to the electric power storage means 300, the electric power is supplied from the three phase AC power source 1 to the ballast capacitor 103 via the three phase voltage type converter 109. When electric power is input from the electric power storage means 300 to the ballast capacitor 103, the electric power is regenerated to the three phase AC power source 1 from the ballast capacitor 103 via the three phase voltage type converter 109. The full bridge converter 104 has power MOSFET elements 61, 62, 63, 64 as switching elements, and the full bridge converter 104 is on/off controlled by the gate control circuit 65. The full bridge converter 80 has the same composition as the full bridge converter 104, and comprises power MOSFET elements 81, 82, 83, 84 and the gate control circuit 85. The half bridge converter 120 is composed of the power MOSFET elements 121, 122, and the gate control circuit 123, and the half bridge converter 114 is composed of the power MOSFET elements 141, 142, and the gate control circuit 143. While the output voltage Vc of the full bridge converter 80 is constant, the output voltage Va of the half bridge converter 114 is obtained as a variable voltage, which is a positive/negative voltage divided by the two ballast capacitor 131, 132. Accordingly, the output voltage (Vc+Va) of the DC power source 200 can be controlled variably in a wide range.

Figure 28:
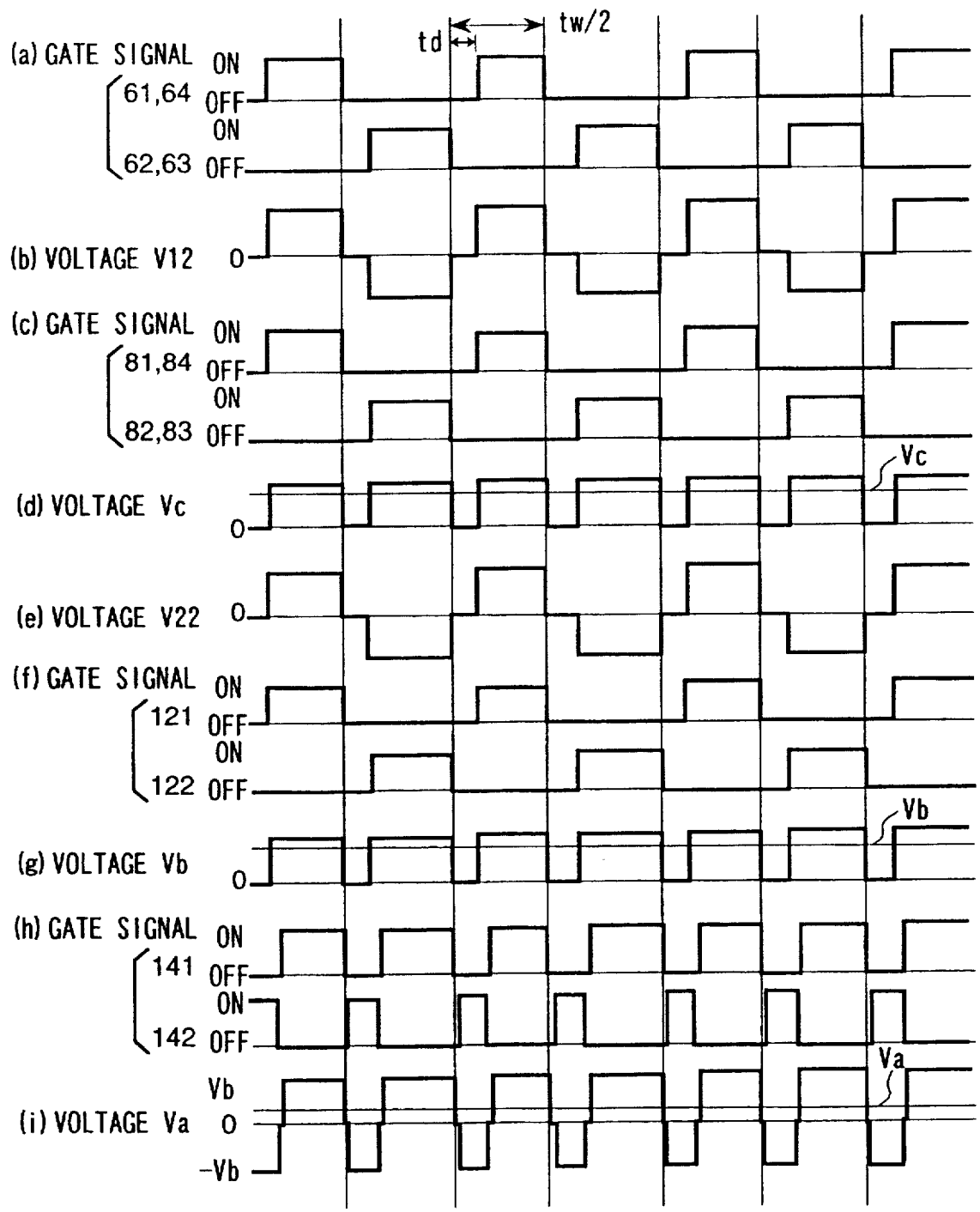
FIG. 28 is a waveform diagram indicating operation of FIG. 27.

The operation waveforms at various portions of this embodiment are indicated in FIG. 28. The operation waveforms of the full bridge converter 104, the high frequency transformers 97, and the full bridge converter 80 are indicated in lines (a)–(d). The gate signals for the respective power MOSFET elements 61, 62, 63, 64 of the full bridge converter 6 are indicated in line (a). At this time, the secondary side voltage v12 of the high frequency transformer 97 becomes as indicated in line (b). When the operation frequency of the full bridge converter 104 is set at 20 kHz, the period tw becomes 50 µs (tw/2 is 25 µs). The time td, which is the time for turning both of the power MOSFET elements of the full bridge converter 104 off, is set as a definite value, such as several µs. The wave height value of the secondary side voltage v12 is a value obtained by multiplying the DC voltage Vdc by the winding ratio of the high frequency transformer 97. On the other hand, the gate signals of the power MOSFET elements 81, 82, 83, 84 of the full bridge converter 80 are indicated in line (c). Accordingly, when electric power is supplied from the full bridge converter 104 to the full bridge converter 80, high frequency conversion is performed by the full bridge converter 104, and a rectifying operation is performed by the full bridge converter 80. Here, the power MOSFET elements of the full bridge converter 80 become conductive in a reverse direction when their gate signal is "on". Therefore, for a case in which the voltage drop of the power MOSFET due to the on-resistance is smaller than the voltage drop in a normal direction of the diode, a rectifying operation is performed by the power MOSFET.

On the other hand, when electric power is regenerated from the full bridge converter 80 to the full bridge converter 104, a high frequency conversion is performed by the full bridge converter 80, and a rectifying operation is performed by the full bridge converter 104. Similarly, the power MOSFET elements of the full bridge converter 104 become conductive in a reverse direction when their gate signal is "on". Therefore, in a case in which the voltage drop of the power MOSFET of the full bridge converter 104 due to the on-resistance is smaller than the voltage drop in a normal direction of the diode, a rectifying operation is performed by the power MOSFET. The voltage Vc of the ballast capacitor 90 at this time becomes as indicated in line (d).

On the other hand, operation waveforms of the high frequency transformer 97, and the half bridge converters 120, 114 are indicated in FIG. 28 at lines (e)–(i). The secondary side voltage v22 of the high frequency transformer 97 has the same operation waveform v12 as indicated in line (e). At this time, the half bridge converter 120 gives the gate signal corresponding to the full bridge converter 104 as indicated in line (f). Consequently, like the case of the full bridge converter, the voltage of the two ballast capacitors 131, 132 have the operation waveform as indicated in line (a). The value of the DC voltage is expressed as Va. When electric power is supplied from the full bridge converter 104 to the half bridge converter 120, high frequency conversion is performed by the full bridge converter 104, and a rectifying operation is performed by the half bridge converter 120. On the other hand, when electric power is regenerated from the half bridge converter 120 to the full bridge converter 104, high frequency conversion is performed by the half bridge converter 120, and a rectifying operation is performed by the full bridge converter 104.

The operation waveforms of the half bridge converter 114, the reactor 115, and the capacitor 116 are indicated in FIG. 28 at lines (h), (i). The half bridge converter 114 controls the voltage Vb of the ballast capacitors 131, 132 in an on/off mode with a switching frequency of 40 kHz by the gate signal indicated in line (h). The power MOSFET 141 at the upper side arm of the half bridge converter and the power MOSFET 142 at the lower side arm of the half bridge converter operate in a complementary mode having a non-lapping time, for example, when the power MOSFET 141 is "on", the power MOSFET 142 becomes "off", and when the power MOSFET 142 is "on", the power MOSFET 141 becomes "off". The output voltage of the half bridge converter 114 becomes as indicated in line (i), and a voltage of Vb is output when the power MOSFET 141 is "on", and a voltage of –Vb is output when the power MOSFET 142 is "on". The voltage Va can be obtained by smoothing the output voltage using the reactor 115 and the capacitor 116. The voltage Va is increased by increasing the duty during the "on" period of the power MOSFET 141, and becomes Vb at a maximum. On the other hand, the voltage Va is decreased by increasing the duty during the "on" period of the power MOSFET 142 (that is, extending the "off" period of the power MOSFET 141), and becomes –Vb at a minimum.

As explained above, the voltage Va can be varied in the range from –Vb to Vb by controlling the duty of the power MOSFET at the upper and the lower arms of the half bridge converter. The half bridge converter 114 can transmit electric power bidirectionally from the ballast capacitor 131, 132 to the capacitor 116, or from the capacitor 116 to the ballast capacitors 131, 132.

When the voltage of the ballast capacitor 90 is expressed by Vc, and the voltage of the capacitor 116 is expressed by Va, the output voltage V of the DC power source 200 is expressed by the following equation:

$$V = Vc + Va \qquad (1)$$

When respective high frequency transformers 97, the full bridge converter 104, the full bridge converter 80, and the half bridge converter 120 are set so that Vc becomes 175 V and the Vb becomes 175 V, the voltage Va of the capacitor 116 becomes variable in the range from –175 V to 175 V. At that time, the output voltage V of the DC power source 200 can be controlled variably in the range of 0 V to 350 V. The current, or the voltage of the electric power storage means 300 can be controlled by detecting the current flowing to the electric power storage means 300, or the voltage applied to the electric power storage means 300 using the output current detecting means 117, or the output voltage detecting means 118 indicated in FIG. 27, and controlling the gate signal of the half bridge converter 114 by the gate control circuit 143. The full bridge converter 104, the high frequency transformer 97, and the full bridge converter 80, and the high frequency transformer 97, the half bridge converter 112, and the half bridge converter 114 are operable bidirectionally. Therefore, the DC current can be input or output to the electric power storage means 300 with an output voltage in the range of from 0 V to 350 V.

An operation for charging the electric power storage means 300, which is a secondary battery connected in multi-series, by the DC power source will be explained hereinafter.

When the electric power storage means 300 is assumed to be expressed by an internal electromotive voltage Eb and an internal resistance Rb, a relationship between the charging current Ic and the output voltage V of the DC power source 200 can be expressed by the following equation:

$$V = Eb + Rb \cdot Ic \qquad (2)$$

Accordingly, when Eb=100 V, Rb=0.2Ω, and the charging current Ic=10 A, V becomes 102 V (V=102 V). When Vc=175 V constant, the above condition can be satisfied by controlling the Va to be Va=–73 V. In the above case, the full bridge converter 104, the high frequency transformer 97, and the full bridge converter 80 can be operated in the mode to supply electric power to the electric power storage means 300. On the other hand, the full bridge converter 104, the high frequency transformer 97, the half bridge converter 112, and the half bridge converter 114 are in the mode to regenerate the DC power. Practically, the duty of the half bridge converter 114 is controlled by the gate control circuit 143 so that the charging current Ic coincides with 10 A, although the relationship is shifted from the value expressed by the equation (2) on account of influences of the resistance and inductance components of the wiring, and others. A similar relationship is established when controlling the terminal voltage of the electric power storage means 300 so as to be a designated value.

Next, an operation for discharging the electric power storage means 300, which is formed by secondary batteries connected in multi-series, by the DC power source 200 will be explained hereinafter.

When Eb=100 V, Rb=0.2Ω, and the discharging current Ic=10 A, the output voltage V satisfying the relationship expressed by the equation (2) becomes 98 V. When Vc=175 V constant, the above condition can be satisfied by controlling Va to be Va=−77 V. In the above case, the full bridge converter 104, the high frequency transformer 97, and the full bridge converter 80 can be operated in the mode to regenerate electric power from the electric power storage means 300. On the other hand, the full bridge converter 104, the high frequency transformer 97, the half bridge converter 112, and the half bridge converter 114 are in the mode to supply the DC power to the electric power storage means 300.

Hitherto, a case in which a power MOSFET is used as the switching element has been explained. However, the system can be composed similarly using IGBT elements.

In accordance with the present embodiment as explained above in detail, the output voltage can be controlled in a wide range and precisely by connecting an insulated power source, which is operable bidirectionally, in series, fixing the output of the one insulated power source at a definite value, and making the other insulated power source controllable to output positive/negative values. Because the respective insulated power sources are operable bidirectionally, the system of the present invention is applicable to both a case when DC power is supplied to the electric power storage means, and a case when DC power is regenerated from the electric power storage means.

What is claimed is:

1. A charge and discharge apparatus for electric power storage means comprising:
   an AC power source;
   a transforming apparatus, which comprises a primary winding connected to said AC power source, and plural secondary windings; and
   plural electric power converters comprising plural AC sides to be connected to said plural secondary windings, and plural DC sides to be connected to plural electric power storage means;
   wherein said AC power source comprises an electric power converting portion to be connected to said primary winding; and
   wherein said electric power converting portion is controlled so that the current flown to said primary winding becomes a current reference.

2. A charge and discharge apparatus for electric power storage means as claimed in claim 1, wherein said transforming apparatus is composed by connecting primary windings of plural transformers in series.

3. A charge and discharge apparatus for electric power storage means comprising:
   an AC power source;
   a transforming apparatus, which comprises a primary winding connected to said AC power source, and plural secondary windings; and
   plural electric power converters comprising plural AC sides to be connected to said plural secondary windings, and plural DC sides to be connected to plural electric power storage means;
   wherein said AC power source comprises an electric power converting portion to be connected to said primary winding;
   wherein said transforming apparatus comprises plural transformers, said primary winding is composed by connecting primary side windings of said plural transformers in parallel, and said secondary winding is composed of plural secondary windings of said plural transformers; and
   wherein said plural electric power converters comprise: plural electric power converting circuits including said plural AC sides, and plural chopper circuits including said plural DC sides.

4. A charge and discharge apparatus for electric power storage means as claimed in claim 3, wherein
   at least one of said plural electric power converting circuits is connected to at least two of said plural chopper circuits.

5. A charge and discharge apparatus for electric power storage means comprising:
   an AC power source;
   a transforming apparatus, which comprises a primary winding connected to said AC power source, and plural secondary windings;
   plural electric power converters comprising plural AC sides to be connected to said plural secondary windings, and plural DC sides; and
   terminals to be connected to the electric power storage means, to which both ends of the series connection of said plural DC sides are connected;
   wherein an output voltage of at least one of said plural electric power converters is constant, and an output voltage of at least an other one of said plural electric power converters is variable.

6. A charge and discharge apparatus for electric power storage means comprising:
   an AC power source;
   a first AC/DC power converting means connected to said AC power source;
   a second AC/DC power converting means connected to a DC output of said first AC/DC power converting means;
   primary windings of plural transformers being connected in series to AC output terminals of said first AC/DC power converting means;
   each of secondary windings of said plural transformers being provided with a rectifier;
   each of outputs of said rectifiers being connected to said electric power storage means via a first switching means; and
   each of the outputs of said rectifiers being provided with a second switching means for effecting a short circuit of the output of said rectifiers.

7. A charge and discharge apparatus for electric power storage means as claimed in claim 6, wherein each of said first AC/DC power converting means and said second AC/DC power converting means is a bidirectional electric power converting means enabling conversion of AC to DC, and DC to AC, and full bridge converters having a bidirectional electric power converting function are composed by integrating said rectifiers connected to each of said plural secondary windings, said first switching means, and said secondary switching means.

8. A charge and discharge apparatus for electric power storage means as claimed in any one of claims 6 and 7, wherein said second AC/DC power converting means is provided with a first control means for controlling a current flowing in the primary windings of said transformer to be a designated amperage.

9. A charge and discharge apparatus for electric power storage means as claimed in claim 8, further comprising a second control means to isolate charging or discharging of at least one of plural electric power storage means by one of turning off each of said first switching means provided at secondary side of said plural transformers and turning off each of switching elements composing each of said full bridge converters.

10. A charge and discharge apparatus for electric power storage means as claimed in 9, wherein said control means makes a current flowing in the secondary winding of the transformer bypass by one of turning off each of said first switching means and turning off each of one side of switching elements of said full bridge converters, and concurrently, by one of turning on said second switching means connected to the secondary side of the same transformer and turning on each of an other side of switching elements of said full bridge converters.

11. A charge and discharge apparatus for electric power storage means as claimed in claim 7, wherein said full bridge converters connected to each of plural secondary windings are controlled to operate synchronously with each other than when charge or discharge to said electric power storage means is isolated.

12. A charge and discharge apparatus for electric power storage means comprising:

an AC power source;

a first AC/DC bidirectional power converting means connected to said AC power source; and a second AC/DC bidirectional power converting means connected to a DC output of said first AC/DC bidirectional power converting means;

an electric power supply bus wire connected to an AC output terminal of said second AC/DC bidirectional power converting means, and concurrently, primary windings of plural transformers are connected in parallel to said electric power supply bus wire;

each of secondary windings of said plural transformers is provided with a third AC/DC bidirectional power converting means; and each of outputs of said third AC/DC bidirectional power converting means is connected to said electric power storage means via a first switching means.

13. A charge and discharge apparatus for electric power storage means as claimed in any one of claims 7 and 12, wherein a DC voltage converted by said full bridge converters and said third AC/DC bidirectional power converting means is connected to a second electric power supply bus wire, and concurrently, plural electric power storage means are connected to said second electric power supply bus wire via plural step-up/step-down converting means.

* * * * *